(12) United States Patent
Dreibholz et al.

(10) Patent No.: US 7,744,502 B2
(45) Date of Patent: Jun. 29, 2010

(54) METHOD FOR DRIVING A PARALLEL HYBRID DRIVE TRAIN OF A MOTOR VEHICLE WITH SEVERAL DRIVE UNITS

(75) Inventors: Ralf Dreibholz, Meckenbeuren (DE); Alexander Banerjee, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 742 days.

(21) Appl. No.: 11/787,692

(22) Filed: Apr. 17, 2007

(65) Prior Publication Data

US 2007/0246274 A1 Oct. 25, 2007

(30) Foreign Application Priority Data

Apr. 19, 2006 (DE) ................. 10 2006 018 058

(51) Int. Cl.
*B60W 10/02* (2006.01)
*B60W 10/04* (2006.01)
(52) U.S. Cl. ............................. 477/5; 477/54
(58) Field of Classification Search ................ 477/6, 477/54
See application file for complete search history.

(56) References Cited

U.S. PATENT DOCUMENTS

| | | | |
|---|---|---|---|
| 6,785,598 B2 | 8/2004 | Schiele | |
| 6,808,470 B2 | 10/2004 | Boll | |
| 7,100,720 B2 * | 9/2006 | Ishikawa | ................. 180/65.26 |
| 2005/0038577 A1 * | 2/2005 | Dreibholz et al. | ............. 701/22 |
| 2005/0155803 A1 | 7/2005 | Schiele | |

FOREIGN PATENT DOCUMENTS

| | | |
|---|---|---|
| DE | 4403597 | 8/1995 |
| DE | 10023053 | 12/2001 |
| DE | 10158536 | 7/2003 |
| DE | 102004002061 | 8/2005 |

\* cited by examiner

*Primary Examiner*—Sherry L Estremsky
*Assistant Examiner*—Edwin A. Young
(74) *Attorney, Agent, or Firm*—Davis & Bujold, P.L.L.C.

(57) ABSTRACT

A method for driving a parallel hybrid drive train of a motor vehicle with at least one internal combustion engine, one electric motor and an output. The electric motor is arranged in the drive train between the output and the internal combustion engine. A shifting element is arranged between the internal combustion engine and the electric motor. A hydrodynamic torque converter is arranged between the electric motor and the output. A target output torque applied at the output is subject to the slip hydrodynamic torque converter, is produced by at least the internal combustion engine and the electric motor, and is determined with reference to at least the required target output torque, an actual turbine speed of the hydrodynamic torque converter, or a an equivalent speed of the parallel hybrid drive train, and the actual speed of the electric motor.

25 Claims, 17 Drawing Sheets

METHOD FOR DRIVING A PARALLEL HYBRID DRIVE TRAIN OF A MOTOR VEHICLE WITH SEVERAL DRIVE UNITS

This application claims priority from German Application Serial No. 10 2006 018 058.5 filed Apr. 19, 2006.

FIELD OF THE INVENTION

The invention relates to a method for driving a parallel hybrid drive train of a motor vehicle with several drive units.

BACKGROUND OF THE INVENTION

The parallel hybrid drive trains of vehicles of the known art usually have a starting element, designed as a friction-locking clutch between an internal combustion motor and the output of the vehicle, in order to start the vehicle by means of the internal combustion engine in a known way, whereby the starting element is initially actuated by slipping during the starting process. If a vehicle, such as a hybrid vehicle, is constructed with a drive unit configured as an electric motor, the controlled and regulated slip operation of the starting element is not required, if the starting process of the vehicle is realized exclusively via the electric motor, as electric motors, unlike conventional internal combustions engines, have no minimum rotational speed.

A method of controlling and regulating a drive train of a hybrid vehicle and a drive train of a hybrid vehicle with a friction-locking starting element is known from DE 10 2004 002 061 A1. At the same time, with the method of the invention for controlling and regulating a drive train of a hybrid vehicle with an internal combustion engine, an electric motor, a shifting element located between the electric motor and a drive in a force flow of the drive train, and a continuously variable transmission capacity and a clutching device located between the electric motor and the internal combustion engine, by means of which the electric motor and the internal combustion engine can be functionally connected, a drive train of a hybrid vehicle can be driven such that it is possible to transition from actuation of the hybrid vehicle by the electric motor to parallel actuation of the hybrid vehicle via the electric motor and the internal combustion engine, or to exclusive actuation of the hybrid vehicle by the internal combustion engine of the hybrid vehicle, as well as a starting operation of the internal combustion engine via the electric motor, without reactive torque from the drive train being perceptible to the driver.

In addition, during operation of the drive train, the transmission capacity of the shifting element during a starting operation of the internal combustion engine is set in such a way, that a torque independent of a starting operation of the internal combustion engine is applied to the output of the drive train, whereby torque changes to the output, which occur due to the starting of the internal combustion engine, are preferably avoided by slip operation of the shifting element.

With this method, the rotational speed of the electric motor is raised during the starting phase of the internal combustion engine to a rotational speed value at which it is guaranteed that the shifting element between the electric motor and the output of the drive train is kept in a slip operation during the entire starting operation of the internal combustion engine. The rotational speed value is calculated by means of an algorithm that is implemented in the motor control, the transmission control and/or in a superordinate torque manager.

In addition, there are drive trains of motor vehicles known from prior art with internal combustion engines having minimum operating speeds that are constructed to realize a starting operation of the vehicle on the part of internal combustions engine with a starting element configured as a hydrodynamic torque converter.

SUMMARY OF THE INVENTION

The present invention is based on a method of operating a parallel hybrid drive train of a vehicle constructed with a starting element configured as a hydrodynamic torque converter, through the use of which, a parallel hybrid drive train can be operated across its entire operating range to an extent that ensures a high driving comfort.

With the method of the invention for operating a parallel hybrid drive train of a vehicle with several drive units and with one output, at least one internal combustion engine and one electric motor are provided, and the at least one electric motor is arranged in the output chain between the output and the at least one internal combustion engine. A friction-locking shifting element is provided between the internal combustion engine and the electric motor, while a hydrodynamic torque converter is arranged between the electric motor and the output. A target drive to be applied to the output depends on slip of the hydrodynamic torque converter which is arranged between the electric motor and the output. A target torque to be produced by at least one of the drive units is determined via an inverse converter recognition of the hydrodynamic torque converter, in order to represent the target output torque to be applied to the output, subject to the required target output torque, an actual turbine rotational speed of the hydrodynamic torque converter, or a rotational speed magnitude of the parallel drive train, and the actual rotational speed of the electric motor that is equivalent to it.

This ensures that when representing the target output-torque required at the output, the target torque to be produced by a drive unit of the parallel hybrid drive train, or simultaneously by several drive units of the parallel drive train, will be determined subject to the converter slip, i.e. in relation to the input rotational speed and the output rotational speed of the torque converter. This means that the target drive torque of the drive unit or drive units of the parallel hybrid drive train will be determined in relation to the target drive torque requested, or as the case may be is supposed to be applied to the output, and a rotational speed of the output that is determined by means of measuring technology or a rotational speed value of the parallel hybrid drive train that is equivalent to it.

In an advantageous variant of the method of the invention for operating a parallel hybrid drive train of a vehicle with several drive units and with one output, a target input speed of the electric motor or a rotational speed value of the parallel hybrid drive train equivalent to it, is determined via the inverse converter known value, subject to the required target output torque, which is used to calculate a control deviation between the actual rotational speed of the electric motor and the actual rotational speed figure of the parallel hybrid drive train equivalent to it and the target input speed of the electric motor or a rotational speed value of the parallel hybrid drive train equivalent to it.

If the torque converter can be bridged via a converter lockup-clutch, whose transmission capacity can be continuously adjusted, and which is arranged parallel in the parallel hybrid drive train, it is provided, in a further advantageous variant of the method of the invention, that the proportion of the target torque that is supposed to be conducted via the converter lockup-clutch will be adjusted in relation to the rotational speed of the output and the target torque that is to be applied to the output.

BRIEF DESCRIPTION OF THE DRAWINGS

Additional advantages and advantageous further developments of the invention can be seen in the examples of embodiments that are described in principle with reference to the drawings, wherein.

DETAILED DESCRIPTION OF THE INVENTION

Figure 1:
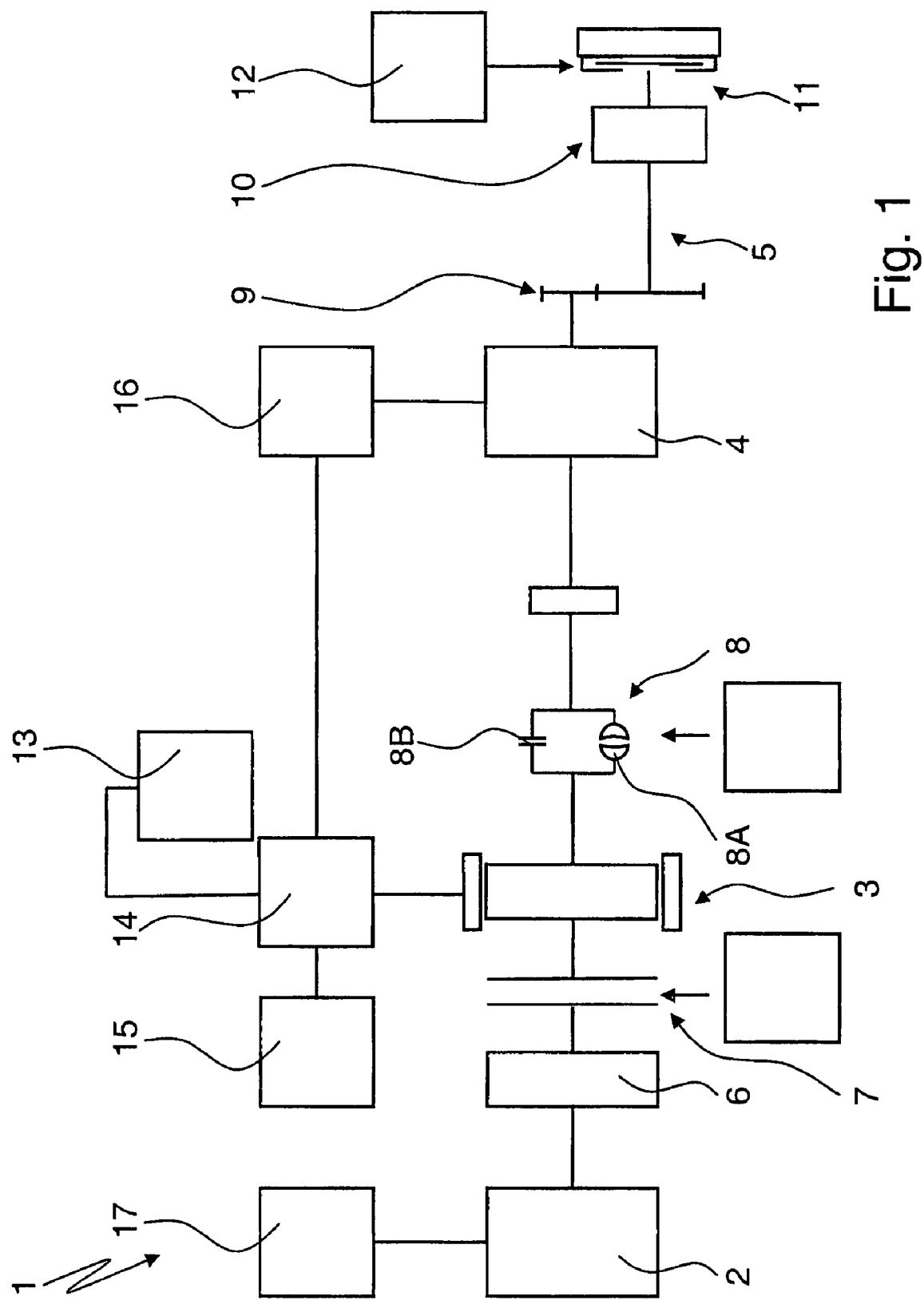
FIG. 1 is a highly schematic presentation of a parallel hybrid drive train with a torque converter and a parallel converter bridging clutch in a parallel hybrid drive train.

In FIG. 1, a parallel hybrid drive train 1 of a vehicle is shown in a highly schematic presentation in the form of a block diagram. The parallel hybrid drive train comprises an internal combustion engine 2, an electric motor 3, a transmission 4, and an output 5. A device 6 for attenuating rotational uniformity and a friction-locking shifting element 7 are arranged between the internal combustion engine 2 and the electric motor 3.

By means of a shifting element 7, a functional connection can be established between the internal combustion engine 2 and the electric motor 3, in order to implement different operating states of the parallel hybrid drive train, such as actuation by the electric motor 3 alone, parallel actuation via the internal combustion engine 2 and the electric motor 3, or drive exclusively via the internal combustion engine 2.

In addition, by arranging the shifting element 7 between the internal combustion engine 2 and the electric motor 3, there is also the possibility of only coupling the internal combustion engine 2 to the electric motor 3 via the shifting element 7 when the rotational energy of the electric motor 3 necessary for a startup operation of the internal combustion engine, is present, so that the internal combustion engine is started by the electric motor 3.

In addition, a startup element with a continuously variable transmission capacity is provided including a torque converter 8A, which is configured as a so-called Trilok converter, and a converter bridging clutch 8B, which is arranged parallel to it in the parallel hybrid drive train 1, to be arranged between the electric motor 3 and the transmission 4, which is arranged on the side of the electric motor 3 that faces away from the internal combustion engine 2, by means of which startup element the electric motor 3 has a functional connection with the transmission 4 and the drive 5. The transmission is predominantly constructed as a conventional automatic transmission, by means of which different transmission ratios can be presented, whereby the transmission can be any transmission known from practical application.

On the side that faces away from the startup element 8, or as the case may be, the transmission-housing side, the transmission 4 has a functional connection, via an axis differential 9, with the wheels 10 of a vehicle drive shaft of the parallel hybrid drive train 1. In the area of the wheels 10, part of a brake system 11 is presented, which is constructed with a so-called brake booster 12. The brake booster 12 is a device, by means of which the brake system, in a coasting mode of the parallel hybrid drive train, is automatically actuated to apply an anti-thrust torque on the output 5, when an electric accumulator 13 assigned to the electric motor 3, is completely charged by the electric motor 3, which is driven by a generator, and the electric motor 3 cannot apply a sufficient motor braking torque on the output 5. The electric accumulator 13 is connected via an electric control 14 with the electric motor 3, a vehicle electric system 15, and an electric transmission control device 16, whereby the transmission control device 16 is provided to control the transmission 4. A motor control unit 17 is provided to control the internal combustion engine.

Figure 2:
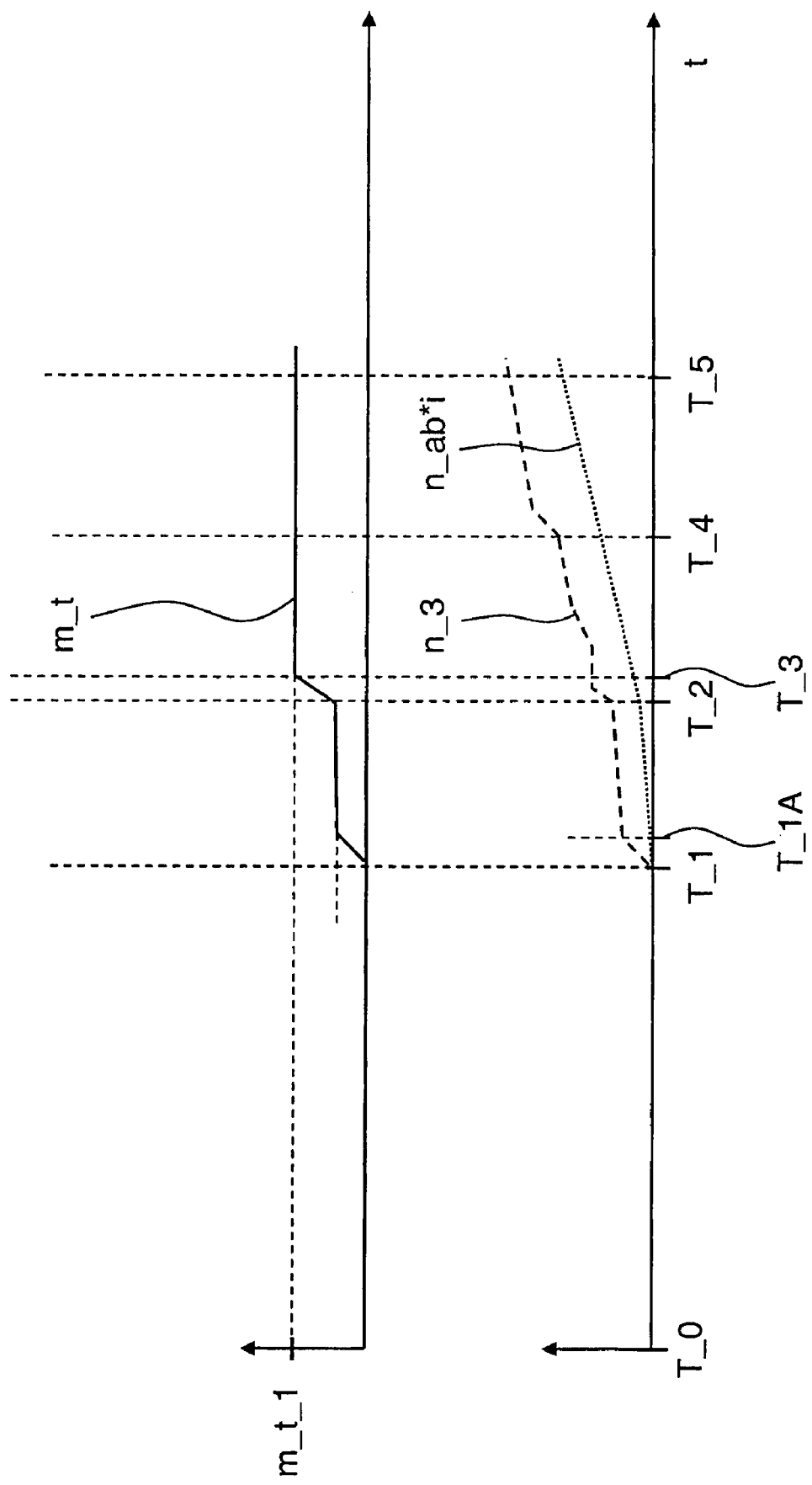
FIG. 2 is a graphical representation of several corresponding operating parameter curves of different components of the parallel hybrid drive train presented in FIG. 1, which come into play during a startup operation of a vehicle configured with a parallel hybrid drive train according to FIG. 1, when the converter bridging clutch is disengaged.

FIG. 2 presents several curves of the operating-state parameters of the components of the parallel hybrid drive train 1, which are presented in FIG. 1, and which come into play during a startup operation of the vehicle, during which the converter bridging clutch 8B is completely disengaged, and the vehicle is essentially started exclusively via the hydrodynamic torque converter 8A.

Between the points in time $T\_0$ and $T\_5$, which are presented in FIG. 2, there is a startup operation, or as the case may be, a startup phase of a vehicle, during which the vehicle is driven exclusively by the electric motor 3. Based on the point in time $T\_0$, which in this case principally characterizes a starting time of engaging a gear and the starting operation, there is initially no engagement of a reduction stage, or as the case may be starting reduction.

At a point in time $T\_1$, the starting ratio is applied in the transmission 4, and a so-called rotation speed control of the electric motor is started and the speed $n\_3$ of the electric motor 3 is increased to a predefined value and only slightly increased up to the point in time $T\_2$. The increase in the speed $n\_3$ of the electric motor 3 leads to a corresponding increase in a turbine torque $m\_t$, which is set on the basis of the speed $n\_3$ of the electric motor, or as the case may be, the output torque produced by the electric motor 3 and the characteristic value of the converter of the hydrodynamic torque converter 8A.

In addition, the increase in the speed $n\_3$ of the electric motor 3, and the resulting increase in the turbine torque $m\_t$ of the torque converter 8A also leads to an increase in the speed $n\_ab*i$ at the transmission input of the transmission 4, which principally corresponds to the turbine speed $n\_t$ of the torque converter 8A and is smaller than the speed $n\_3$ of the electric motor 3, or as the case may be, the pump impeller of the hydrodynamic torque converter 8A. The reference sign $n\_ab$ thereby corresponds to the speed of the output 5 and the reference sign i to an overall multiplication factor consisting of the transmission overall multiplication factor of the transmission 4 and the axis differential 9.

The increase in the speed $n\_3$ of the electric motor 3 and the slight increase in the speed $n\_3$ of the electric motor between the points in time $T\_1A$ and $T\_2$ leads to a buildup of a creeping torque at the output 5. The slip of the torque converter 8A is graphically reproduced by means of the deviation between the curve of the speed $n\_3$ of the electric motor 3 and the speed $n\_ab*i$ in FIG. 2.

At the point in time $T\_2$ a driver-request command in the form of actuation of a performance-request element, such as a gas pedal, for example, results in an increase in the speed $n\_3$ of the electric motor 3 in the way presented in the curve of the speed $n\_3$, up to the point in time $T\_5$. At the same time, the turbine torque $m\_t$ of the torque converter 8A increases to a torque value $m\_t\_1$ that approximates the target torque $m\_drive\_target$ demanded by the driver.

At the point in time $T\_4$, a demand is issued by a superordinate driving strategy to shut off the internal combustion engine 2, which results in a further increase in the speed $n\_3$ of the electric motor 3 up to the point in time $T\_5$, which marks the end of the startup operation based on the curves of the operating parameters. At the point in time $T\_5$, the parallel hybrid drive train 1 is prepared, according to FIG. 1, for a starting operation by the electric motor of the internal combustion engine 2, while the driver demand target output torque $m\_drive\_target$ torque is still presented via the torque converter 8A at the output 5 of the parallel hybrid drive train.

Through slip operation of the torque converter 8A during the starting operation of the internal combustion engine, there is attenuation of the torque fluctuations, with respect to the torque converter 8A, that result from connecting the internal combustion engine 2 in the part of the parallel hybrid drive train 1 on the internal combustion engine side in the area of the torque converter 8A; and changes in the torque applied to the output through starting the internal combustion engine 2 are avoided.

Figure 3:
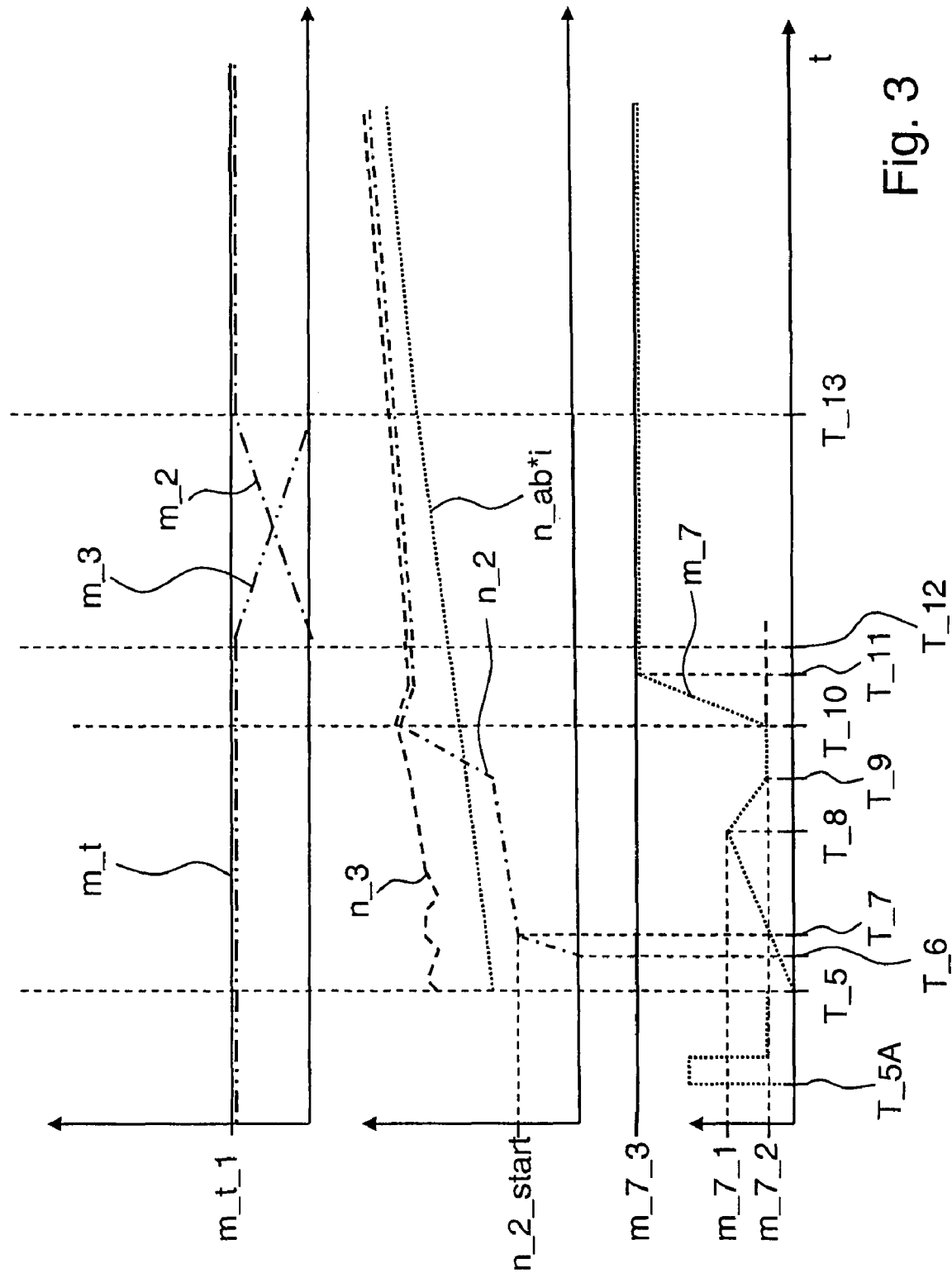
FIG. 3 is a graphical representation of several curves of operating parameters of different components of the parallel hybrid drive train according to FIG. 1, that come into play during a startup operation of the internal combustion engine with a disengaged converter bridging clutch.

As represented in FIG. 3, at a point in time $T\_5A$, which precedes the point in time $T\_5$, a filling phase for the shifting element 7 is started, which prepares the shifting element 7 for engagement, and which consists of a rapid filling phase and a filling equalization phase, and which is terminated at the point in time $T\_5$. At the point in time $T\_5$, the activating pressure of the shifting element 7, and thus its transmission capacity $m\_7$, are increased as shown in FIG. 3, leading to an increase in the transmission capacity of the shifting element 7, and the internal combustion engine 2 being driven by the electric motor 3. This leads to the speed $n\_2$ of the internal combustion engine 2 being increased, at a point in time $T\_6$, from zero to a starting speed $n\_2$, and started at a point in time $T\_7$, at which the gradient of the curve of the speed $n\_2$ of the internal combustion engine changes.

The initial value $m\_7\_1$ of the transmission capacity of the shifting element 7 is reached at a point in time $T\_8$, and is then immediately reduced via a ramp to a second value $m\_7\_2$, by a point in time $T\_9$, and prior to the point in time $T\_10$, at which the speed $n\_2$ of the internal combustion engine 2 corresponds to the speed $n\_3$ of the electric motor, it is held at this value. Subsequently, the shifting element 7, which is now in a synchronous state, is completely engaged by increasing the transmission capacity $m\_7$, whereby the internal combustion engine 2 is connected in a torsion resistant manner with the electric motor 3.

The guiding of the transmission capacity $m\_7$ of the shifting element 7 results in the speed $n\_2$ of the internal combustion engine 2 being only slightly increased above the starting speed $n\_2$ from the time of connection $T\_7$ to the point in time $T\_9$ and being carried over into an operating state without rotational uniformity. Starting from this operating state, the speed $n\_2$ of the internal combustion engine 2 is guided, with considerably steeper gradients, to the speed $n\_3$ of the electric motor, whereby the shifting element 7 is put into an at least approximately slippage-free operating state. In that way, the shifting element 7 can be completely engaged via the intended ramp between the points in time $T\_10$ and $T\text{-}11$, without producing drive-train side reaction torques in the parallel hybrid drive train 1. The transmission capacity $m\_7$ of the shifting element 7 is left constant, after the point in time $T\_11$, at a third value $m\_7\_3$, at which the shifting element 7 displays its full transmission capacity.

At a point in time $T\_12$, the adherence of the shifting element 7 is detected. In this case, the term adherence is understood as a state of the shifting element 7, in which the shifting element 7 is operated over a predefined period of time with a differential speed smaller than a predefined threshold value of the slippage of the slip element 7.

Simultaneously, at the point in time T_12, a load acceptance phase from the electric motor 3 to the internal combustion engine 2 is started, whereby input torque m_3 of the electric motor 3 is decreased, in the way shown in FIG. 3, between the points of time T_12 and T_13, and drive torque m_2 of the internal combustion engine 2 is increased during the period of time defined by the points in time T_13 and T_12. In this way, the target output torque m_drive_target, demanded by the driver, is made available at the output 5 at all times without deviation, and by the point in time T_13, is still represented only by the drive torque m_2 of the internal combustion engine 2.

The converter bridging clutch 8B is completely disengaged during both the startup operation on which the curves according to FIG. 2 are based, and during the startup operation of the internal combustion engine 2, on which the curves according to FIG. 3 are based, and has no influence on the curves of the operating parameters shown in FIG. 2 and FIG. 3, or on the representation of the target output torque at the output 5.

Selected control of the converter bridging clutch 8B provides a possibility, in a simple manner, to reduce the influence of the converter bridging clutch during the operation of the parallel hybrid drive train 1, subject to the currently set transmission capacity of the converter bridging clutch, or as the case may be, to completely eliminate when the converter bridging clutch is completely engaged.

Figure 4:
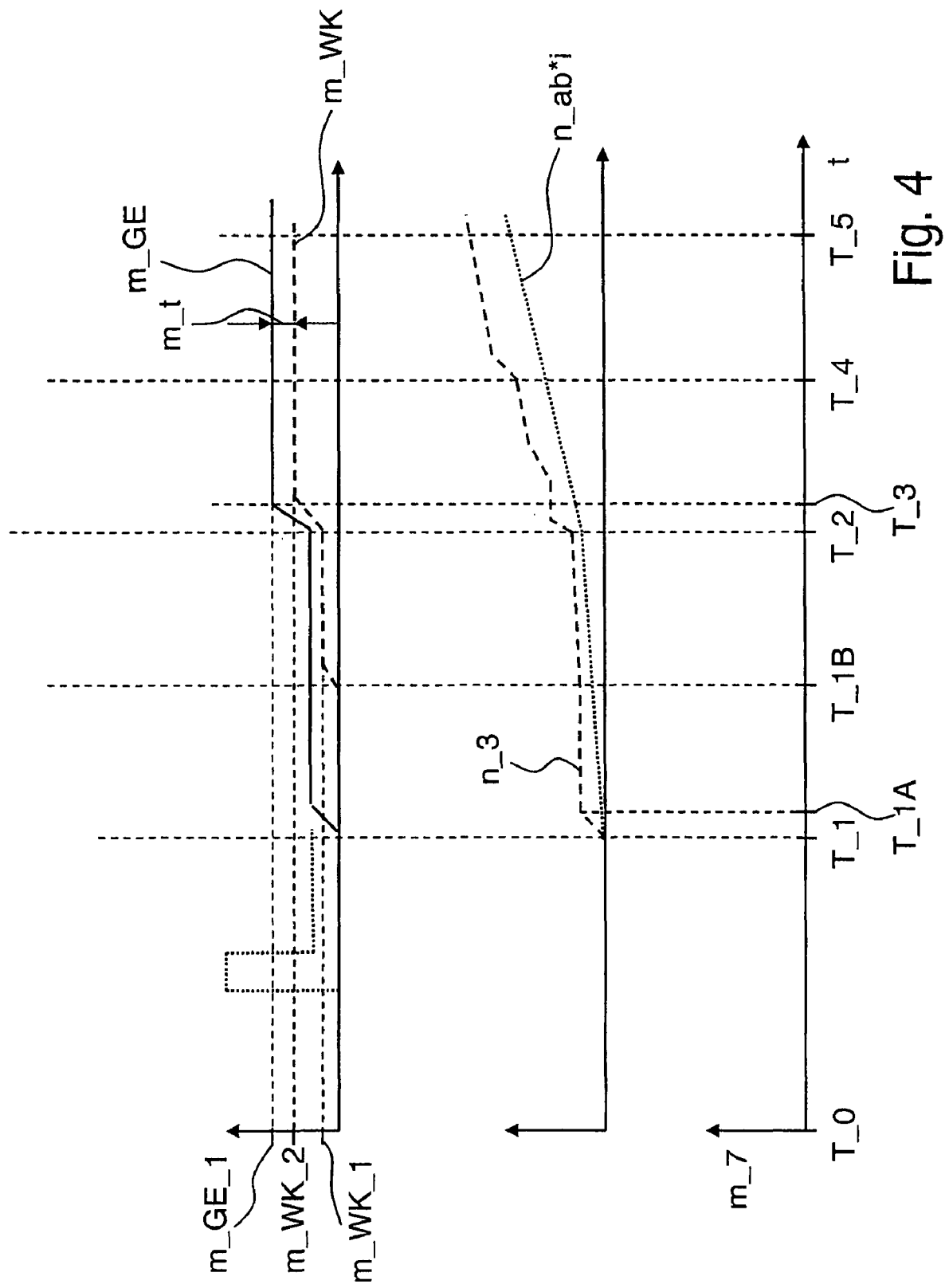
FIG. 4 is a graphical representation corresponding to FIG. 2 of operating parameter curves of different components of the parallel hybrid drive train according to FIG. 1 which come into play during a startup operation with slipping converter bridging clutch.
Figure 5:
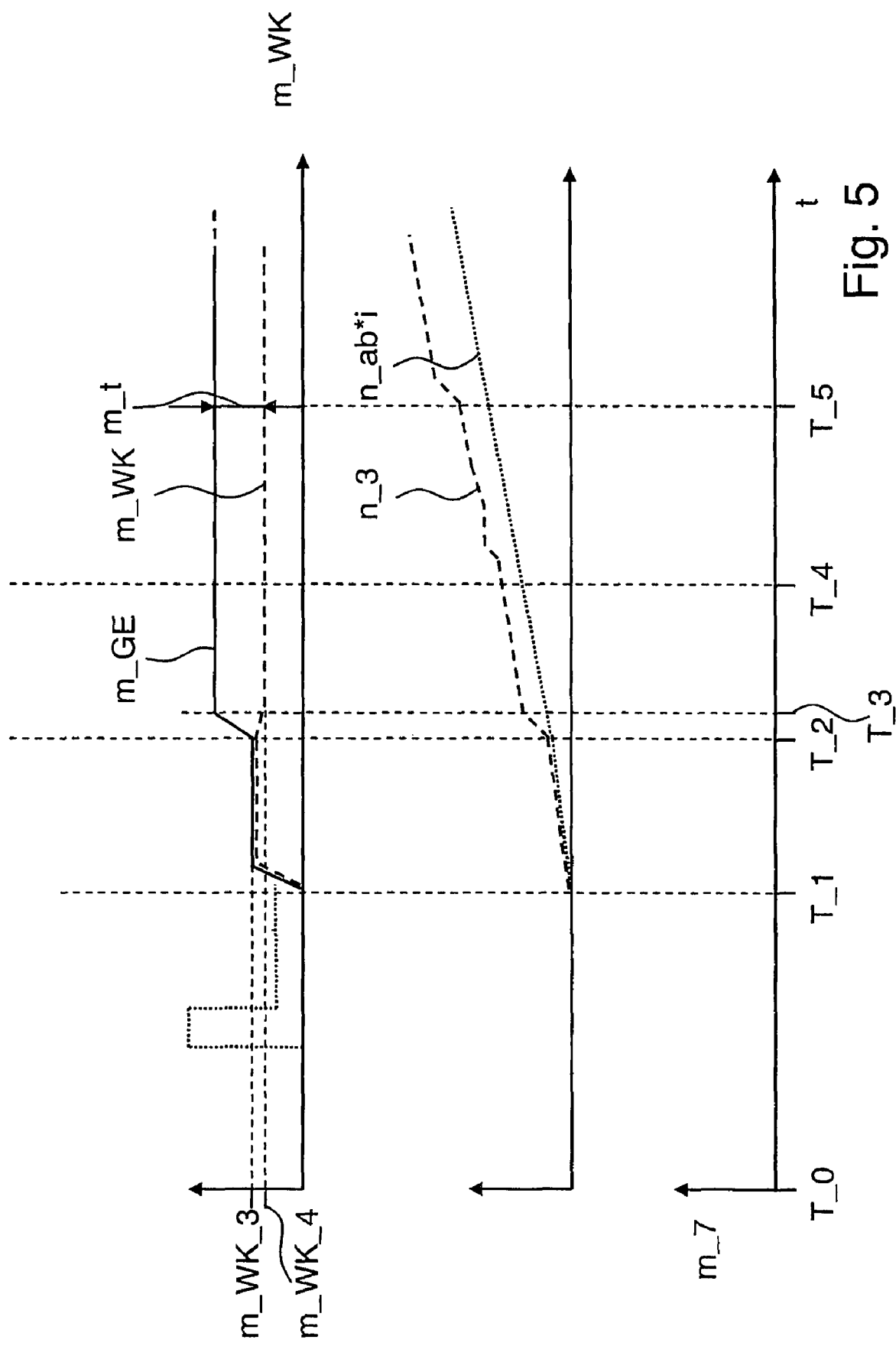
FIG. 5 is a graphical representation corresponding to FIG. 4 of the operating parameter curves that come into play during a startup operation that deviates from the curves that form the basis for a startup operation according to FIG. 4.

The influence on the operating behavior of the parallel hybrid drive train 1, according to FIG. 1, which results from additional activation of the converter bridging clutch 8B of the starting element 8 is shown during two different startup operations of a vehicle in FIG. 4 and FIG. 5. In addition, there is a graphical representation in FIG. 6 to FIG. 9, of the potential influences of actuation of the converter bridging clutch 8A on the operational behavior of the parallel hybrid drive train 1 during different startup operations of the internal combustion engine 2, and these will be explained in more detail in the subsequent description.

As in the case of the startup operation shown in FIG. 2, the startup operations of a hybrid motor vehicle on which the curves of the operational parameters of the different components of the parallel hybrid drive train 1 presented in FIG. 4 and FIG. 5 are based, are initially carried out with only a target drive torque produced by the electric motor 3. With increasing time t, the internal combustion engine 2 is started as described below by means of the electric motor 3 and is subsequently available, if needed, as an additional drive unit for driving the motor vehicle.

The startup operation on which the curves of the operational parameters according to FIG. 4 are based differs from the startup operation on which the curves of the operational parameters according to FIG. 2 are based in that at a point in time T_1B, which precedes the point in time T_2, the transmission capacity m_WK of the converter bridging clutch 8B is increased from a value, at which the converter bridging clutch 8B is completely disengaged, to a first intermediate value m_WK_1, and is retained at this value until the point in time T_2. In that way, a part of the drive torque produced by the electric motor 3, which is dependent on the currently set transmission capacity of the converter bridging clutch 8B, is conveyed via the converter bridging clutch 8B in the direction of the output 5, while the other part of the drive torque produced by the electric motor is conveyed by the electric motor 3 via the hydrodynamic torque converter 8A of the starting element 8 in the direction of the output 5.

As the slippage in the area of the torque converter 8A is reduced by the increased transmission capacity of the converter bridging clutch 8B, the speed n_ab*i at the transmission input of the transmission 4 increasingly approaches the speed n_3 of the electric motor 3 between the points of time T_1B and T_2.

At the point in time T_2, when the driver command is issued for the torque to be applied to the output 5, the speed n_3 of the electric motor 3 is increased, causing an increase in the turbine torque m_t of the torque converter 8A. At the same time, the transmission capacity m_WK of the converter bridging clutch 8B is increased to a predefined intermediate value m_WK_2, which depends on the required target output torque m_drive_target, and kept steady at this value, so that there is a temporal curve at the transmission input of the speed n_ab*i as shown in FIG. 4, and also of the transmission input torque m_GE as of the point in time T_2. With the converter bridging clutch engaged, the transmission input torque m_GE consists of the part of the target drive torque of the electric motor 3 conveyed by the converter bridging clutch 8B and the turbine torque m_t of the torque converter 8A that results from converter recognition.

At the point in time T_4, when a command to start the internal combustion engine 2 is issued by the superordinate driving strategy, the speed n_3 of the electric motor 3 is increased via a ramp, as illustrated in FIG. 4, and steadily raised with the increase in the time t, to prepare the parallel hybrid drive train 1 in such a way for the startup procedure of the internal combustion engine 2, which immediately follows the starting operation on which the curves of the operating parameters of the components of the parallel hybrid drive train 1 are based, that no output-side reactive torque occurs at the output of the vehicle due to the starting of the internal combustion engine 2.

During the startup procedure, the transmitting capacity of the converter bridging clutch 8B is set in such a way, that the converter bridging clutch 8B is operated with slip, and the driver-ordered target torque is presented at the output 5, taking into account the converter recognition of the torque converter 8A, with the torque of the electric motor 3 that is adjusted subject to the converter recognition and the transmission capacity of the converter bridging clutch 8B.

With the startup procedure on which the curves of operating parameters of the parallel hybrid drive train 1 shown in FIG. 5 are based, the transmitting capacity m_WK of the converter bridging clutch 8B is increased, at the point in time T_1, at which the startup ratio is set in the transmission 4, to a third intermediate value m_WK_3, at which the converter bridging clutch 8B is essentially completely engaged and the torque converter 8A is completely bridged by the converter bridging clutch 8B. In that way, the torque produced by the electric motor 3 is conveyed without any influence on the converter recognition of the torque converter 8A in the direction of the output 5, which results in the application, at the output 5, of an output, or as the case may be, crawling torque, which causes slight movement of the vehicle.

At the point in time T_2, i.e. when the driver steps on the gas pedal, the transmission capacity m_WK of the converter bridging clutch 8B is reduced to a fourth intermediate value m_WK_4, and the converter bridging clutch 8B is brought into slip operation, so that the drive torque produced by the electric motor 3 is also conveyed to a certain extent via the torque converter 8A in the direction of the output 5.

At the end of the startup procedures on which the presentations according both FIG. 4 and FIG. 5 are based, the parallel hybrid drive train 1, according to FIG. 1, is prepared for a starting procedure of the internal combustion engine that immediately follows the startup procedures, such that starting the internal combustion engine 2 at output 5 produces no perceptible reactive torque for the driver of the vehicle, as the torque fluctuations, with reference to the starting element 8, are attenuated in the internal combustion-machine side section of the parallel hybrid drive train 1 in the area of the starting element 8, and changes in the torque applying to the output due to starting of the internal combustion engine 2 are avoided in a simple manner.

This is made possible, on the one hand, by the torque converter 8A, which slips across its entire operating range, and the converter bridging clutch 8B, which slips during the starting procedure of the internal combustion engine 2.

Figure 6:
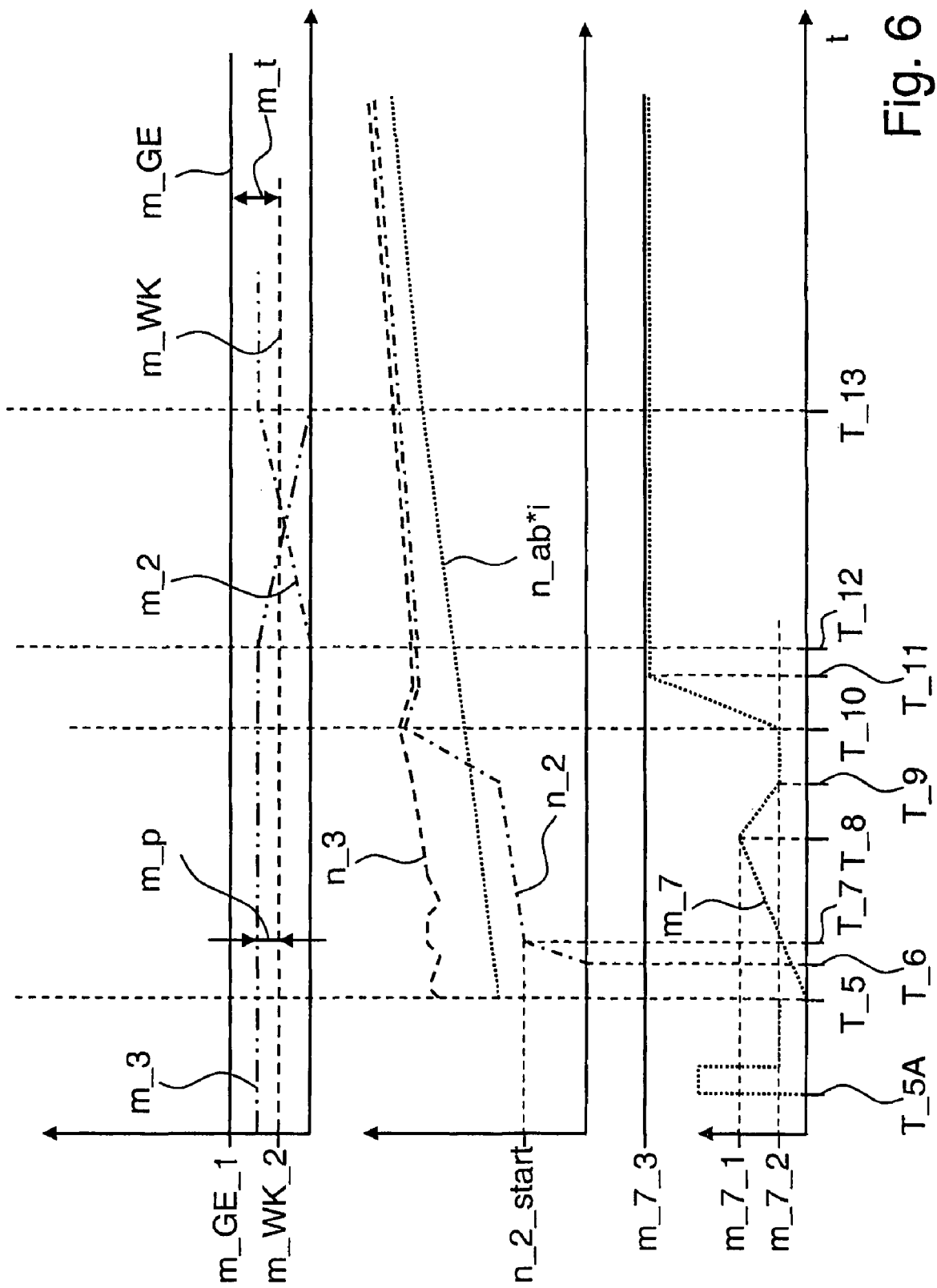
FIG. 6 is a graphical representation of the curves of operating parameters of different components of the parallel hybrid drive train according to FIG. 1, which come into play during a startup operation of the internal combustion engine with a slipping converter bridging clutch that follows a startup operation according to FIG. 4 or 5.

In the case of the starting procedure of the internal combustion engine 2, on which the curves of operating parameters of the components of the parallel hybrid drive train 1 shown in FIG. 6 are based, the shifting element 7 is actuated in fundamentally the same manner as in the starting procedure according to FIG. 3. At the same time, the transmitting capacity m_WK of the converter bridging clutch 8B is kept at the fourth intermediate value m_WK_4 during the entire starting procedure, to represent the target output torque to be applied at the output 5. This means that the converter bridging clutch 8B is still slipping at the end of the starting procedure according to FIG. 6, i.e. at the point in time T_13.

During the load acceptance phase from the electric motor 3 to the internal combustion engine 3, between the points in time T_12 and T_13, the target drive torque to represent the target output torque to be applied at the output is, transitionally, jointly produced, without change, by the two drive units of the parallel hybrid drive train 1, whereby the proportion of the target drive torque of the electric motor 3 and the internal combustion engine 2 that changes with the curve of time is graphically represented in FIG. 6 by the respective curves of the drive torque m_3 of the electric motor 3 and the drive torque m_2 of the internal combustion engine 2. After the point in time T_13, the target drive torque, in this case, is produced entirely by the internal combustion machine 2, while the electric motor 3 produces no more torque as of the point in time T_13.

Of course it is left to the discretion of the person skilled in the art to allow the electric motor, after the point in time T_13, to continue to take part in the production target torque, subject to the required target output torque, or to transfer to generator operation, during which the electric accumulator 13 of the parallel hybrid drive train 1 is charged due to the internal combustion-side drive of the internal combustion engine 2.

Figure 8:
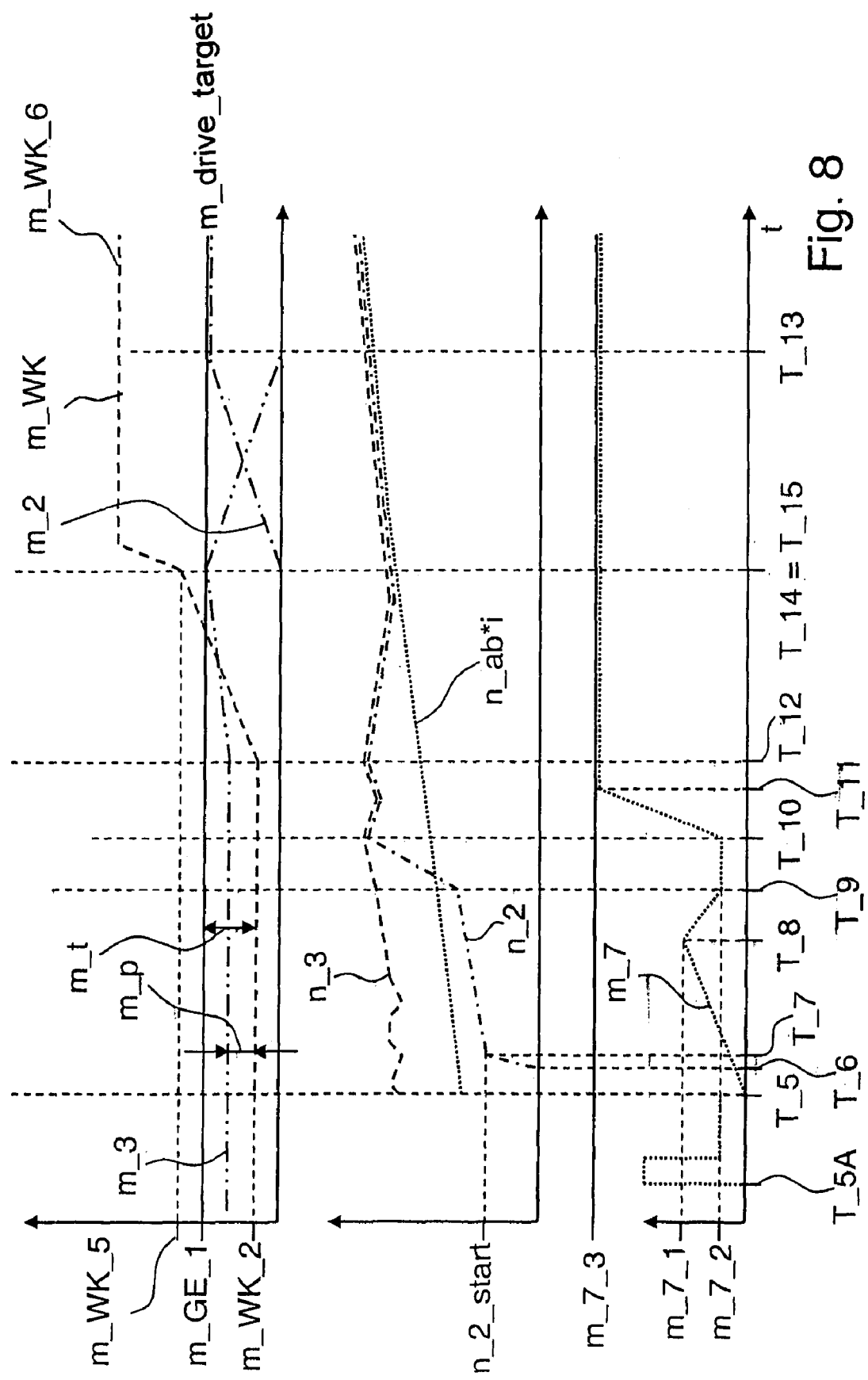
FIG. 8 is a graphical representation corresponding to FIG. 6 and FIG. 7 of operating parameter curves that come into play during a startup operation that deviates from the operating parameter curves that form the basis for a startup operation according to FIG. 6 and FIG. 7.
Figure 9:
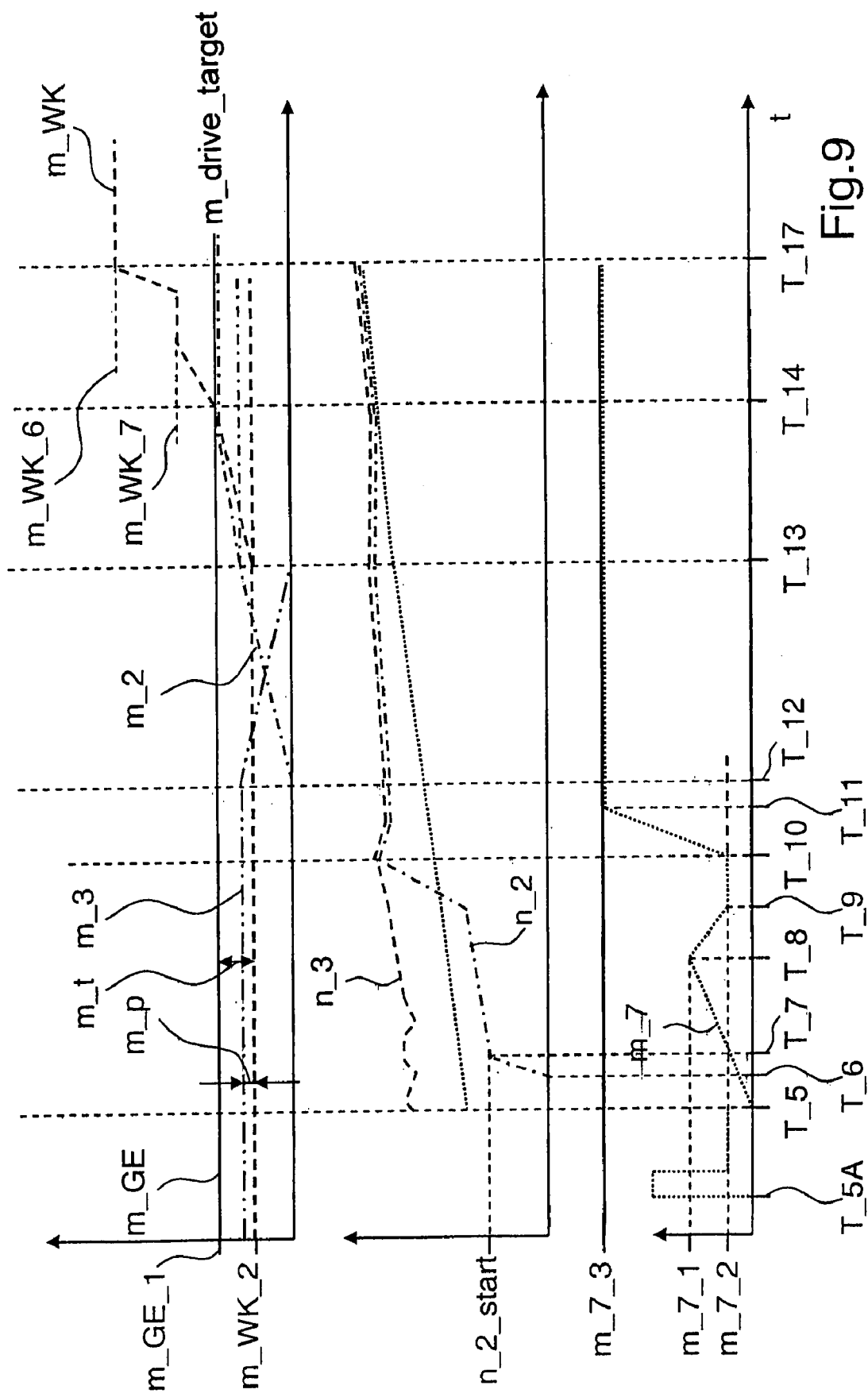
FIG. 9 is a graphical representation corresponding to FIG. 6 to FIG. 8 of the operating parameter curves that come into play during a startup operation that deviates from the operating parameter curves that form the basis for a startup operation according to FIG. 6 to FIG. 8.
Figure 10:
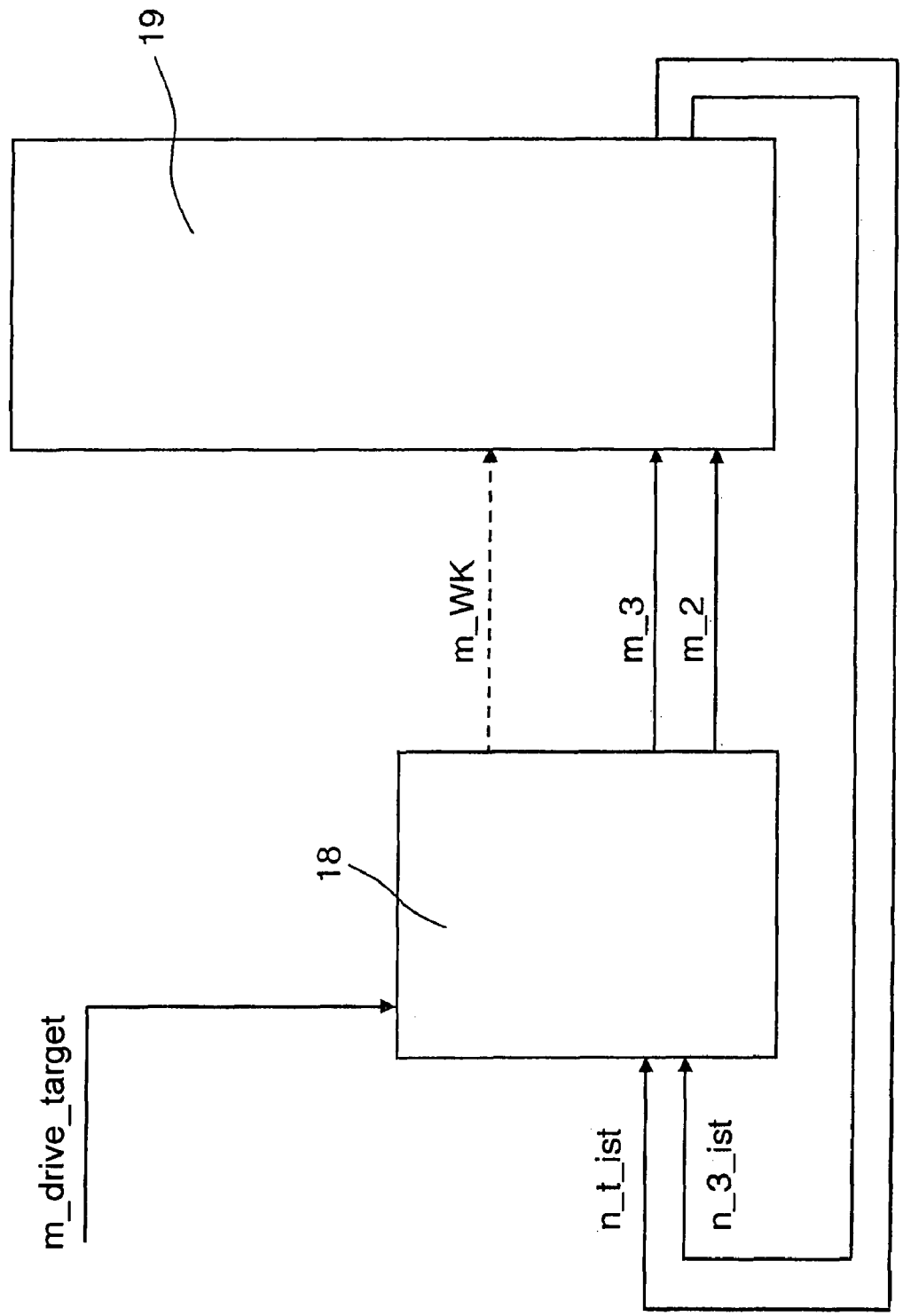
FIG. 10 is a block diagram of a rotational speed controller structure for controlling and regulating a target drive torque of the drive assembles of the parallel hybrid drive train according to FIG. 1 subject to a target drive torque that is to be applied to the output, an actual turbine speed of the torque converter, and an actual speed of the electric motor during normal drive operation of a vehicle.
Figure 15:
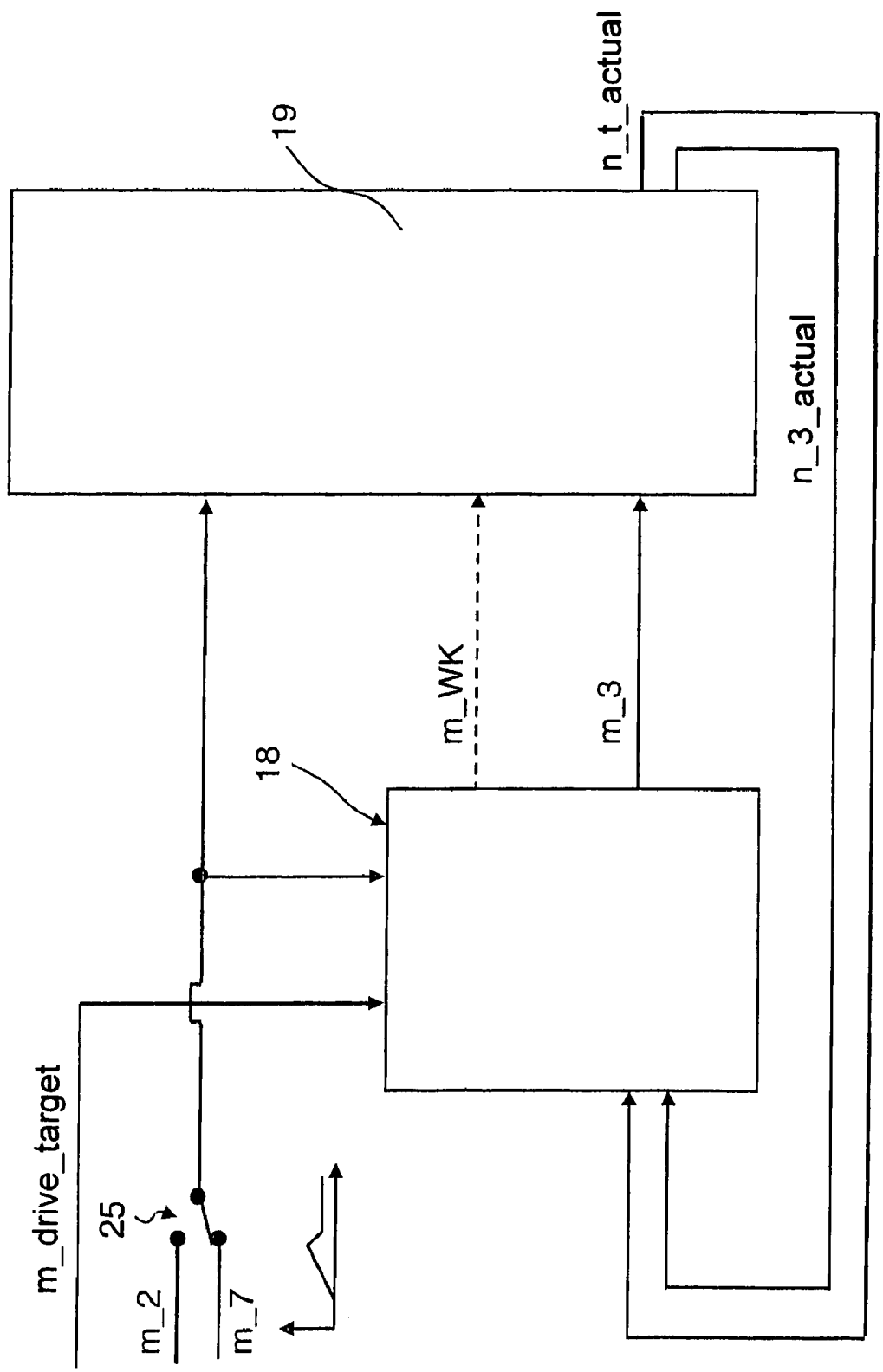
FIG. 15 is a block diagram of a speed regulator structure for setting a target drive torque of the electric motor of the parallel hybrid drive train according to FIG. 1 subject to the transmission capacity of the converter bridging clutch and a transmission capacity of a shifting element arranged between the electric motor and the internal combustion machine during a startup operation of the internal combustion machine.

Fundamentally, in the case of all of the starting procedures on which the representations in FIG. 6 to FIG. 9 are based, the converter bridging clutch 8B is run in the slip operation that is necessary for high driver comfort, until the point in time T_12, subject to the target output torque m_drive_target specified by the driver, with the assistance of a speed regulator structure presented in more detail in FIG. 10 or FIG. 15.

Moreover, the curves shown in FIG. 6 to FIG. 9 of the operating parameters of the various components of the parallel hybrid drive train 1 according to FIG. 1, up to the point in time T_12, at which the second shifting element 7 is completely engaged, essentially manifest no differences. Only after the point in time T_12 do the curves shown in FIG. 6 to FIG. 9 differ in the respective starting procedures on which they are based, in the way that the converter bridging clutch 8B is put into a synchronous operating state and then completely closed, as well as at the point in time at which a load acceptance takes place from the electric motor 3 to the internal combustion engine.

Figure 7:
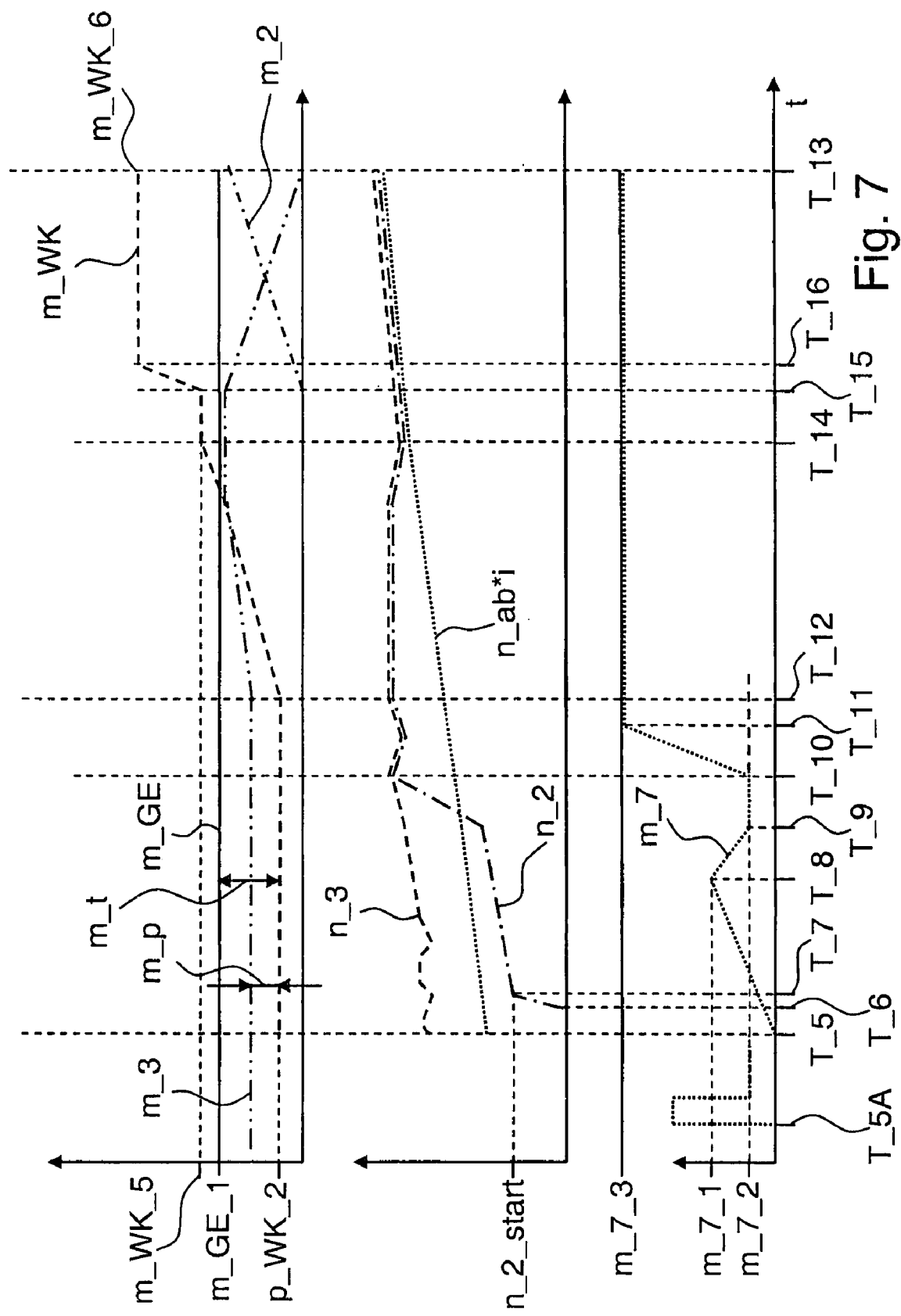
FIG. 7 is a graphical representation corresponding to FIG. 6 of operating parameter curves that come into play during a startup operation that deviates from the curves that form the basis for a startup operation according to FIG. 6.

With the starting procedure on which the curves shown in FIG. 7 are based, the transmission capacity of the converter bridging clutch 8B, at the point in time T_12 at which a shifting element 7 is recognized, is increased in the direction of a fifth intermediate value m_WK_5 based on the second intermediate value m_WK_2, whereby the intermediate value m_WK_5 of the transmission capacity of the converter bridging clutch 8B is reached at a point in time T_14. The fifth intermediate value m_WK_5 of the transmitting capacity of the converter bridging clutch 8B corresponds to one value, in addition to which the converter bridging clutch 8B is essentially in a slip-free operating state, and both the speed n_3 of the electric motor 3 and the speed n_2 of the internal combustion engine 2 correspond to the transmission input speed n_ab*i.

This means that during the period of time defined by the points in time T_12 and T_14, slip of the converter bridging clutch 8B from increasing the transmitting capacity m_WK of the converter bridging clutch is reduced, whereby the reduction of the slippage of the converter bridging clutch 8B can be supported by an additional control of the torque m_2 produced by the internal combustion engine 2.

After the point in time T_14, the transmitting capacity of the converter bridging clutch 8B is fixed at the fifth intermediate value m_WK_5 until the point in time T_15, whereupon at the point in time T_15, the adherence of the converter bridging clutch 8B is recognized and the transmitting capacity m_WK is subsequently increased via a ramp, which ends at a point in time T_16, to a sixth intermediate value m_WK_6, at which the converter bridging clutch 8B is completely engaged and demonstrates its full transmitting capacity.

Simultaneously, at the point in time T_15, the load acceptance phase of the electric motor 3 to the internal combustion engine 2 is started, whereby the drive torque m_3 of the electric motor 3 is reduced in the way shown in FIG. 7 between the points in time T_15 and T_13, and the drive torque m_2 of the internal combustion engine 2 is increased, during the period defined by the points in time T_15 and T_13, in such a way, that the target output torque m_drive_target requested by the driver remains unchanged at the output 5 during the entire load acceptance phase and is represented completely at the point in time T_13 by means of the internal combustion engine 2.

The starting procedure on which the curves presented in FIG. 8 are based differs from the curves presented in FIG. 7 in that the point in time T_15, at which an adherence of the converter bridging clutch 8B is recognized, coincides with the point in time T_14, at which the transmission capacity m_WK of the converter bridging clutch 8B reaches the fifth intermediate value m_WK_5, and the non-slip condition of the converter bridging clutch 8B is reached earlier than in the case of the starting procedure according to FIG. 7 through both a corresponding motor control of the internal combustion engine 2 and through the increase in the transmitting capacity m_WK of the converter bridging clutch 8B. For this reason, the transmitting capacity m_WK at the end of the pressure ramp, i.e. at the point in time T_15, is increased immediately to the sixth intermediate value m_WK_6, without an additional dwell phase, when the converter bridging clutch 8B is completely engaged and displays its full transmitting capacity, whereby in the case of the starting procedure according to FIG. 8 as well, the load acceptance phase is implemented between the point in time T_15 and the point in time T_13, at which the process of the invention is ended.

In the starting procedure on which FIG. 7 is based, the load acceptance phase is started as early as the point in time T_12, at which the adherence of the shifting element 7 is recognized, and the converter bridging clutch 8B is still in slip operation, and engaged with the converter bridging clutch still slipping. The means that the point in time T_13 is prior to the point in time T_14, at which the converter bridging clutch 8B is in essentially synchronous operation, and the point in time T_15, at which the transmitting capacity m_WK of the converter bridging clutch 8B is increased via a pressure ramp from the second intermediate value m_WK_2 to the sixth intermediate value m_WK_6, and the method of the invention is ended at a point in time T_17.

FIG. 9 represents two different possibilities regarding control of the transmitting capacity of the converter bridging clutch 8B after the point in time T_13, i.e. after the end of the load acceptance phase.

With the first possibility, the transmitting capacity m_WK of the converter bridging clutch 8B remains at the second intermediate value m_WK_2, at which the converter bridging clutch 8B is driven during the starting procedure. Then the converter bridging clutch 8B is also in slip operation after the end of the starting procedure of the internal combustion engine 2. At the same time, the target drive torque, now produced exclusively by the internal combustion engine, which depends on the target torque m_drive_target adhering to the output 5, is constantly set at the value that it reached at the end of the load acceptance phase, i.e. at the point in time T_13. The difference between the drive torque m_2 of the internal combustion machine 2 and the value m_GE_1 of the transmission input torque m_GE, which is equivalent to the target output torque m_drive_target, is derived from the torque conversion in the area of the hydrodynamic torque converter 8A, which, in the drive operation of the parallel hybrid drive train 1 following the point in time T_13, is in an operating state in which there is a corresponding and actually known increase of the pumping torque m_p, i.e. the drive torque m_2 of the internal combustion engine.

With the second possibility, the capacity m_WK of the lockup converter clutch 8B is increased, after the point in time T_13, to a seventh intermediate value m_WK_7, at which the converter bridging clutch is operated without slip. At the same time, the drive torque m_2 of the internal combustion engine 2 is also increased, as the influence of the torque converter 8A decreases with progressively decreasing slip of the converter bridging clutch 8B, and the torque rise in the area of the torque converter 8A declines. This ensures that when non-slip operation of the converter bridging clutch 8B is achieved, the target output torque to be applied at the output 5 is still represented. This means that the drive torque m_2 of the internal combustion engine 2 at the point in time T_14, after which the converter bridging clutch 8B is in non-slip operation, corresponds to the value m_GE_1 of the transmission input torque m_GE, whereby the dependent relationship between the target output torque and the transmission input torque m_GE is sustained in the known way by means of the ratio of the transmission 4 and the ratio of the axis differential 9 respectively.

FIG. 10 shows a method of the invention for setting a target torque m_drive_target that is demanded by the driver during normal drive operation of a parallel hybrid drive train 1 in the form of a strongly schematized block diagram. In addition to an actual speed n_3_actual of the electric motor 3, i.e. the input speed of the starting element 8 in the electric motor provided by measurement technology, and an actual turbine speed n_t_actual of the torque converter 8A, which corresponds to an output speed n_8 of the starting element 8 of the parallel hybrid drive train 1 according to FIG. 1, and a transmission-side output speed of the starting element 8, the target output torque m_drive_target demanded by the driver represents an input value of a control and regulator device 18 of the speed regulator structure according to FIG. 10, by means of which respectively parameters for a target drive torque m_2 of the internal combustion engine 2, of the target drive torque m_3 of the electric motor 3, and the target transmitting capacity m_WK of the converter bridging clutch 8B are supplied. The target drive torques m_2 and m_3 of the internal combustion engine 2 and the electric motor 3, as well as the target transmitting capacity m_WK or the converter bridging clutch 8B represent the control and regulator device 18 output values that are supplied to the system vehicle, or as the case may be, the real process 19 as target operation parameters.

Figure 11:
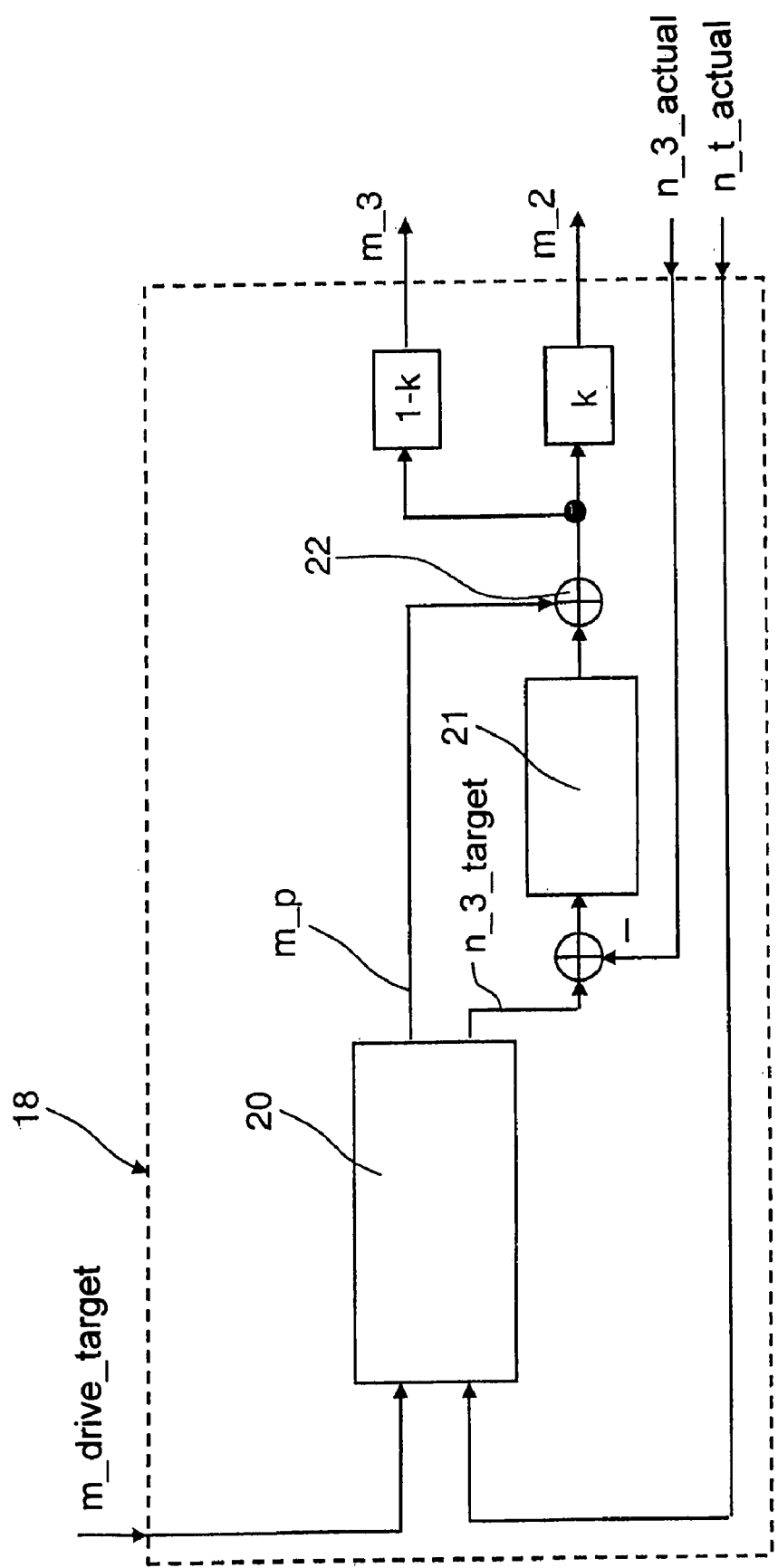
FIG. 11 is a detailed block diagram presentation of a controller and regulator device presented in FIG. 10 without a target value specification for the actuation of the converter bridging clutch.

FIG. 11 shows a first version of a control and regulation device 18 of the speed-regulation structure shown in FIG. 10 in a detailed block diagram presentation. The target output torque m_drive_target requested by the driver and the actual turbine speed n_t_actual, which is derived from measurement technology, are the input values of a first functional block 20 of the control and regulator device 18, by means of which, dependent on an inverse converter recognition, there is determination of a pumping torque m_P of the torque converter 8A, and a target drive speed n_3_target of the electric motor 3, or as the case may be, an electric-machine side input speed of the starting element. Between the target drive speed n_3_target of the electric motor, which is calculated in functional block 20, and the measured actual speed n_3_actual of the electric motor, there is determination of a control deviation, which is added to a regulating unit 21 that is realizable as a proportional-integral controller or a PID controller, whose initial value represents a control algorithm of the target drive torque m_3 of the electric motor 3. The control algorithm of the target drive torque m_3 of the electric motor 3 is added, at a nodal point 22, to the target parameter of the pumping torque m_p, which is provided in the functional block 20, which represents a control parameter for the target torque m_3 of the electric motor. The sum of the control parameters of the target drive torque m_3 of the electric motor 3 and the control algorithm of the target drive torque m_3 of the electric motor 3, represents, on principle, the total of the target drive torque that is to be supplied by the drive units, i.e. the electric motor 3 and/or the internal combustion machine 2, of the parallel hybrid drive train 1 according to FIG. 1, that is required to represent the target output torque m_drive_target to be applied at the output 5.

In principle, there is the possibility that the target drive torque of the electric motor 3 will be exhausted by the internal combustion engine 2, with a corresponding operating state of the parallel hybrid drive train, i.e. for example, a normal drive operation of the parallel hybrid drive train by means of the internal combustion engine 2, if no torque is produced by the electric motor 3. In addition, there is also the possibility that the electric motor 3 will be driven by a generator in order to charge the electric accumulator 13 and conduct a torque into the parallel hybrid drive train 1 that counteracts the torque of the internal combustion engine 2.

As the target output torque m_drive_target demanded by the driver is provided respectively in different operating states of the parallel hybrid drive train 1 by one of the drive units 2 and 3 exclusively, or jointly by both drive units 2 and 3, there is provision for a superordinate drive strategy module, by means of which there is selection of the drive unit or drive units, from which the target drive torque is to be produced. The proportion of the target drive torque m_3 supplied, which is to be produced by the electric motor 3 and/or the internal combustion engine 2 respectively, is preferably conveyed via the drive strategy module after the addition of the control algorithm and the regulation output of the target drive torque m_3 of the electric motor, i.e. after the nodal point 22. In order to do so, the drive strategy module supplies a modal split k, which corresponds to the ratio of the proportion of the target drive torque to be produced by the electric motor 3 to the proportion of the target drive torque to be produced by the internal combustion machine 2. Then the sum, which represents the total target drive torque, and is formed at the nodal point of the regulation output and the control algorithm, is multiplied by the factor k or by the factor 1-k respectively, whereby the results represent the torques to be produced by the individual drive units 2, 3 respectively.

Figure 12:
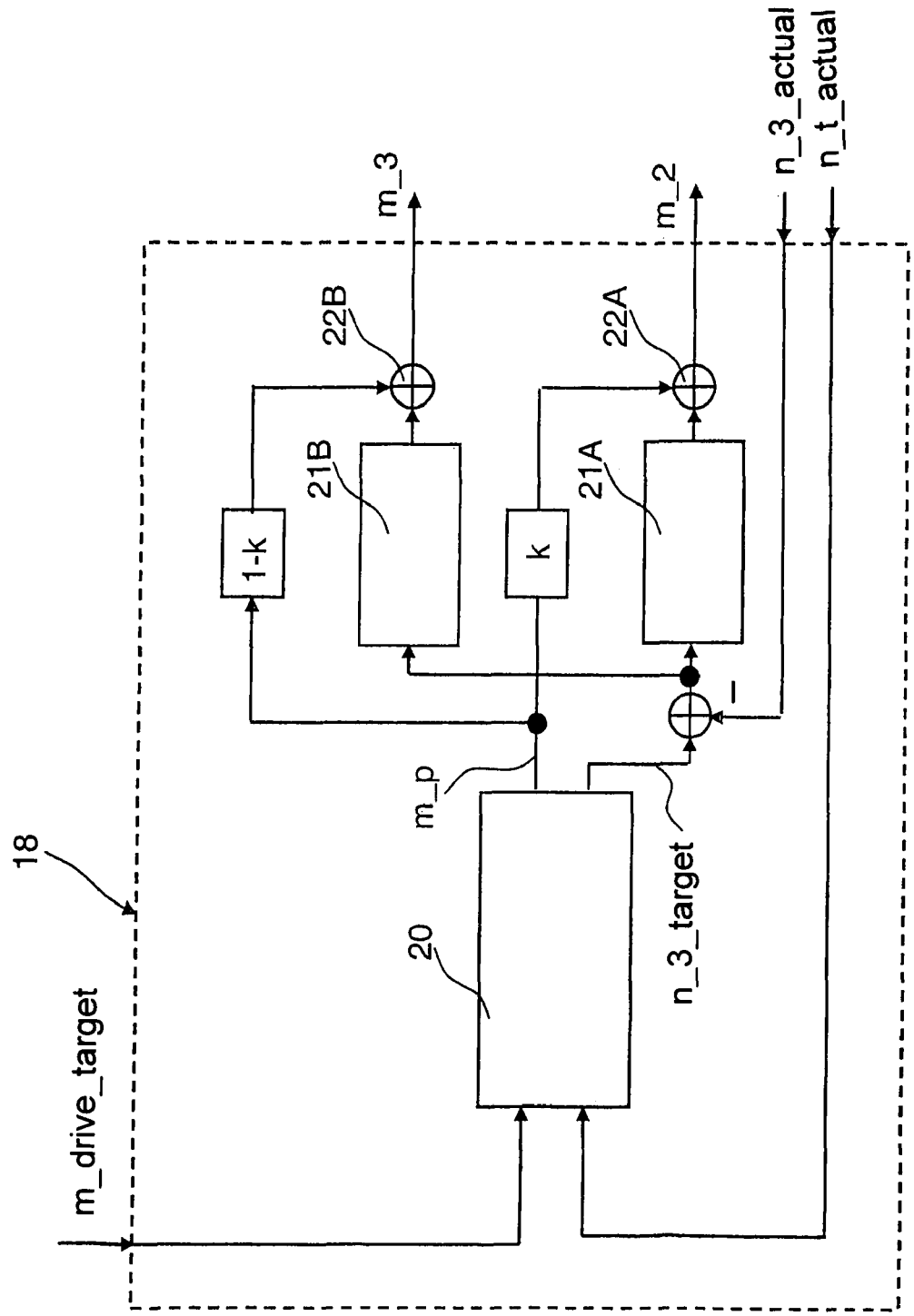
FIG. 12 is a second version of the controller and regulator device according to FIG. 10.

FIG. 12 shows a second embodiment of the control and regulator device 18 depicted in FIG. 18. Here the pumping torque m_p, which is determined by the functional block 20 and represents the target drive torque of the drive units 2 and 3, is segmented via the drive strategy module corresponding to the modal split k before the addition to a corresponding control algorithm of the target drive torque of the drive units 2 and 3. The target drive speed n_3_target of the electric motor 3, which is determined by the functional block 20, and which, which a closed shifting element 7, corresponds to the target drive speed n_2_target of the internal combustion engine 2, is used by the control and regulator device 18, according to FIG. 11 to determine a control deviation compared to the actual speed n_3_actual of the electric motor 3, which corresponds to the pumping speed of the torque converter 8A, or as the case may be, the input speed of the starting element 8 of the parallel hybrid drive train 1. Subsequently, the determined control deviation along with a control unit 21A and a control unit 21B are applied. The control unit 21A is used to determine the control algorithm of the proportion of the target drive torque that is to be produced by the drive units 2 and 3 of the parallel hybrid drive train 1, which is subsequently added, at a nodal point 22A to the proportion, determined by means of the drive strategy module, of the control parameter for the drive units of the parallel hybrid drive train 1, whereby the sum represents the proportion of the target drive torque that is to be produced by the internal combustion engine 2.

In addition, the control deviation between the target drive speed n_3_target, determined by the functional block 20, and the actual speed n_3_actual of the electric motor 3 of the second control unit 21B is applied as an input parameter, whereby the latter control unit 21B is used to determine the control algorithm for the proportion produced by the electric motor 3 of the target drive torque produced by the drive units 2 and 3 of the parallel hybrid drive train 1. The algorithm determined by the control unit 21B is added to the algorithm determined via the drive strategy module at the nodal point 22B, whereby the sum of the control algorithm of the control unit 21B and the control proportion represents the proportion of the target drive torque to be produced by the electric motor 3.

In the case of both the control and regulator device 18 according to FIG. 11 and the control and regulator device according to FIG. 12, the converter bridging clutch 8B is completely disengaged, so the target drive torque produced by the electric motor 3 is conveyed completely via the hydrodynamic torque converter 8A in the direction of the drive 5. This means that the speed-regulator structure presented in FIG. 10 is also suitable for driving a parallel hybrid drive train 1, whose starting element 8 is configured without a converter bridging clutch.

Figure 13:
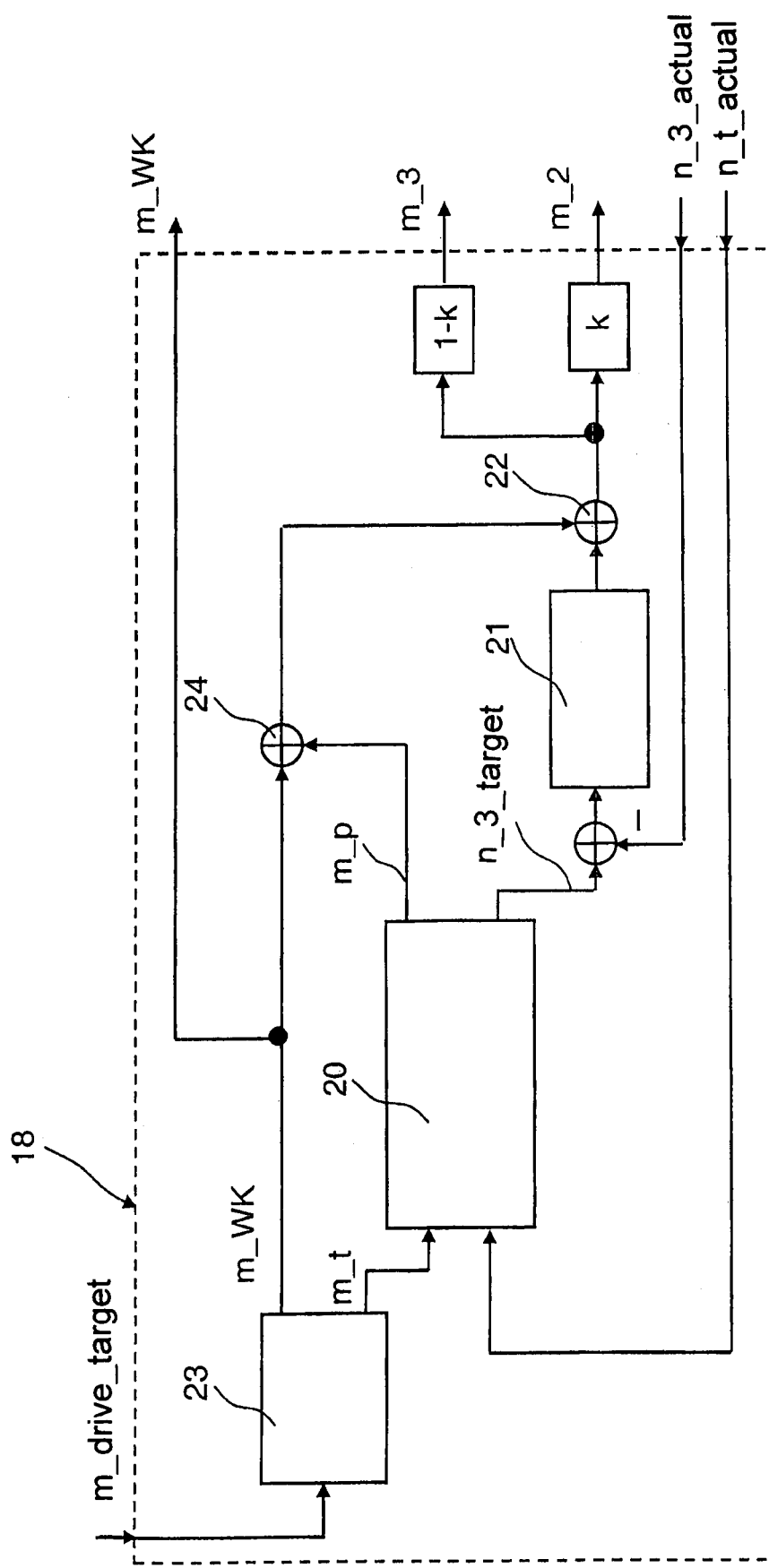
FIG. 13 is a third version of the controller and regulator device according to FIG. 10 with a target value specification for the converter bridging clutch.
Figure 14:
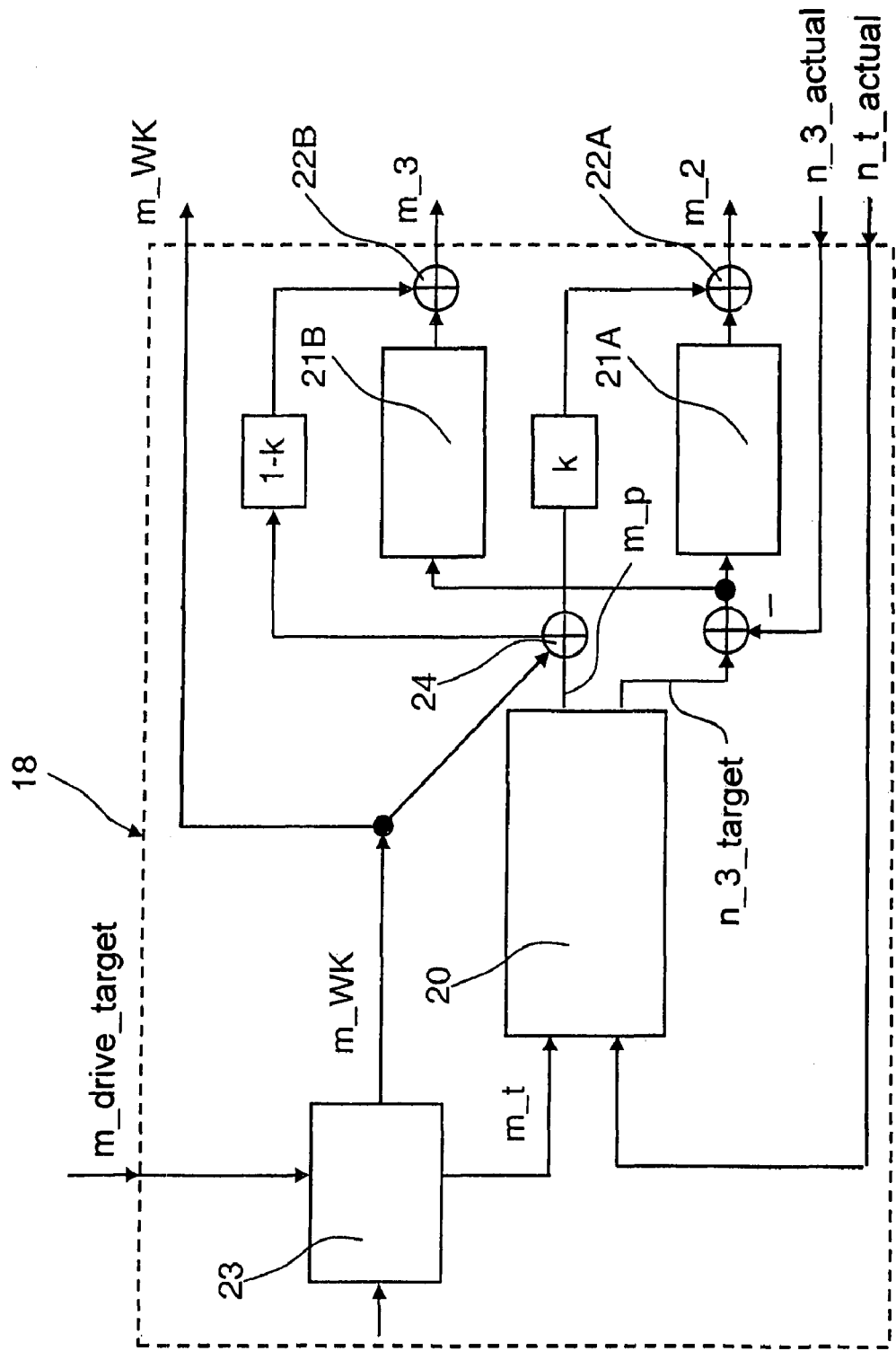
FIG. 14 is a fourth version of the controller and regulator device according to FIG. 10 with a target value specification for the converter bridging clutch.

The embodiments shown in FIGS. 13 and 14 of the control and regulator device 18 of the speed regulator structure according to FIG. 10 are proposed in order also to be able to operate the parallel hybrid drive train 1 according to Fig. in operating states with high driver comfort, during which the converter bridging clutch 8B with transmitting capacity is present, and in which the target drive torque produced by the electric motor 3 and/or the internal combustion engine 2 is conveyed, at least partially, by the converter bridging clutch 8B.

Here, the control and regulator device 18 shown in FIG. 13 presents an expanded solution compared to the control and regulator device 18 according to FIG. 1, while the control and regulator device 18 according to FIG. 14 presents a solution of the control and regulator device 18 according to FIG. 12 that is expanded in the manner described below.

In both the version of the control and regulator device 18 according to FIG. 13 and the version according to FIG. 14, there is a second functional block 23 connected upstream of the first functional block 20, whereby the target output torque m_drive_target demanded by the driver represents an input value of the second functional block 23. Via the second functional block 23, the proportions of the transmission input torque m_GE are determined that are to be conveyed by the converter bridging clutch 8B and the torque converter 8A respectively, whereby a first output value of the second functional block 23 is the target turbine torque m_t of the torque converter 8A, and a second output value is the target torque m_WK that is to be applied via the converter bridging clutch 8B.

The target turbine torque m_t is applied to the first functional block 20 as input value along with the actual turbine speed n_t_actual. Then the target pumping torque m_P and the target drive speed n_3_target of the electric motor 3 are calculated in the first functional block 20, as in the control and regulator devices 18 according to FIG. 11 and FIG. 2.

The target torque m_WK, which is determined via the second functional block 2 and can be carried by the converter bridging clutch 8B, represents an output value of the control and regulator device 18 according to FIG. 13 and FIG. 14. In addition, the control value m_WK is added to the target pumping torque m_P, determined via the first functional block 20 in a further nodal point 24, to determine the control proportion of the target drive torque to be produced by the drive units 2 and 3.

Subsequently the determination of the proportion m_3 and m_2 of the target drive torque to be produced by the electric motor 3 and the internal combustion engine 2 takes place in the manner described in connection with FIGS. 11 and 12, respectively.

In addition to a corresponding engine control, the torque that can be applied to the starting element 8 by the internal combustion engine 2 is also variable by means of corresponding adjustment to the transmitting capacity of the shifting element 7, so that torque fluctuations in the internal combustion engine in the area of a slip-operated shifting element 7 can be compensated for in a simple manner during operating states of the parallel hybrid drive train that are difficult for a motor control.

FIG. 15 shows a speed regulator structure by means of which the parallel hybrid drive train 1 according to FIG. 1 can be operated in the previously described inventive way during a starting acceleration procedure powered exclusively by the electric motor and a subsequent starting procedure by the electric motor of the internal combustion engine 2, without causing reactive torque that impairs driver comfort.

Here, a starting torque, or as the case may be a target output torque m_drive_target, ordered by the driver, to be applied at the output, can initially be represented only via the electric motor 3 at the output 5 subject to the current operating state of the starting element 8.

In the presence of a demand to switch on the internal combustion engine 2 that might be made due to the charge in the electric accumulator 13 being too low, a speed requirement of the electric motor 3, a motor vehicle speed condition and/or a driver requested torque condition, this will be controlled and regulated, or else adjusted, specified by the drive units 2 and 3 of the parallel hybrid drive train 1 in the way described below via a control and regulator device shown in more detail in FIG. 16 or FIG. 17. In this connection, the target output torque m_drive_target represents a control value of the control and regulator device 18, according to FIG. 15, for the actual process 19, or as the case may be, for the parallel hybrid drive train 1 according to FIG. 1.

In each instance shown below, there will be a distinction made between starting acceleration procedures and starting procedures in which the converter bridging clutch 8B is completely disengaged or is activated in order to at least partially bridge the hydrodynamic torque converter 8A in the way described in FIG. 2 to FIG. 9.

Figure 16:
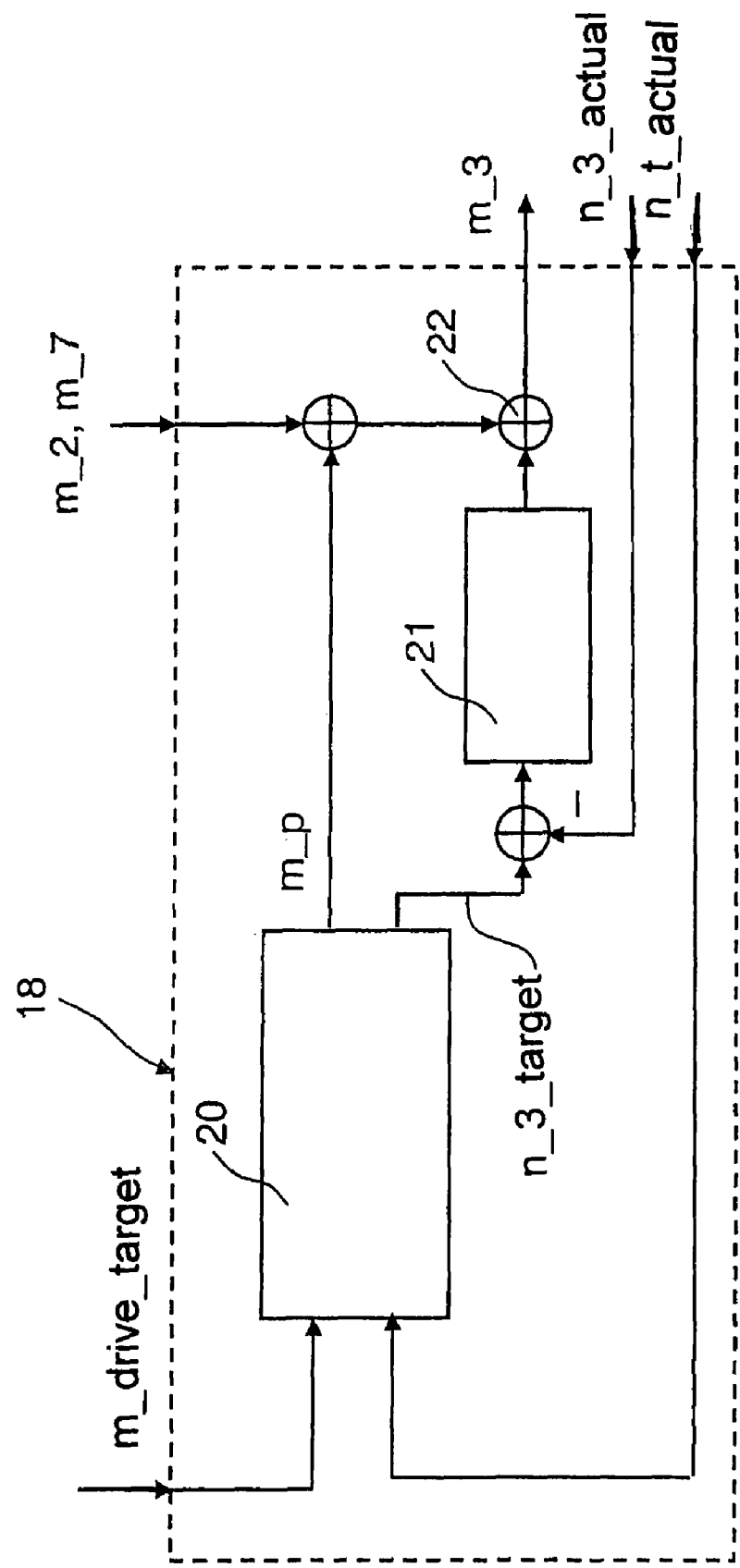
FIG. 16 is a detailed presentation of a block diagram of the controller and regulator device shown in FIG. 15 without target value specification for the converter bridging clutch.

In these instances, the parallel hybrid drive train 1 according to FIG. 1 will be driven, according to FIG. 16, during starting acceleration or starting procedures in which the converter bridging clutch 8B is completely disengaged, with a control and regulator device 18 according to FIG. 16, which fundamentally corresponds to the control and regulator device 18 according to FIG. 11 without splitting the target drive torque between the electric motor 3 and the internal combustion engine.

Figure 17:
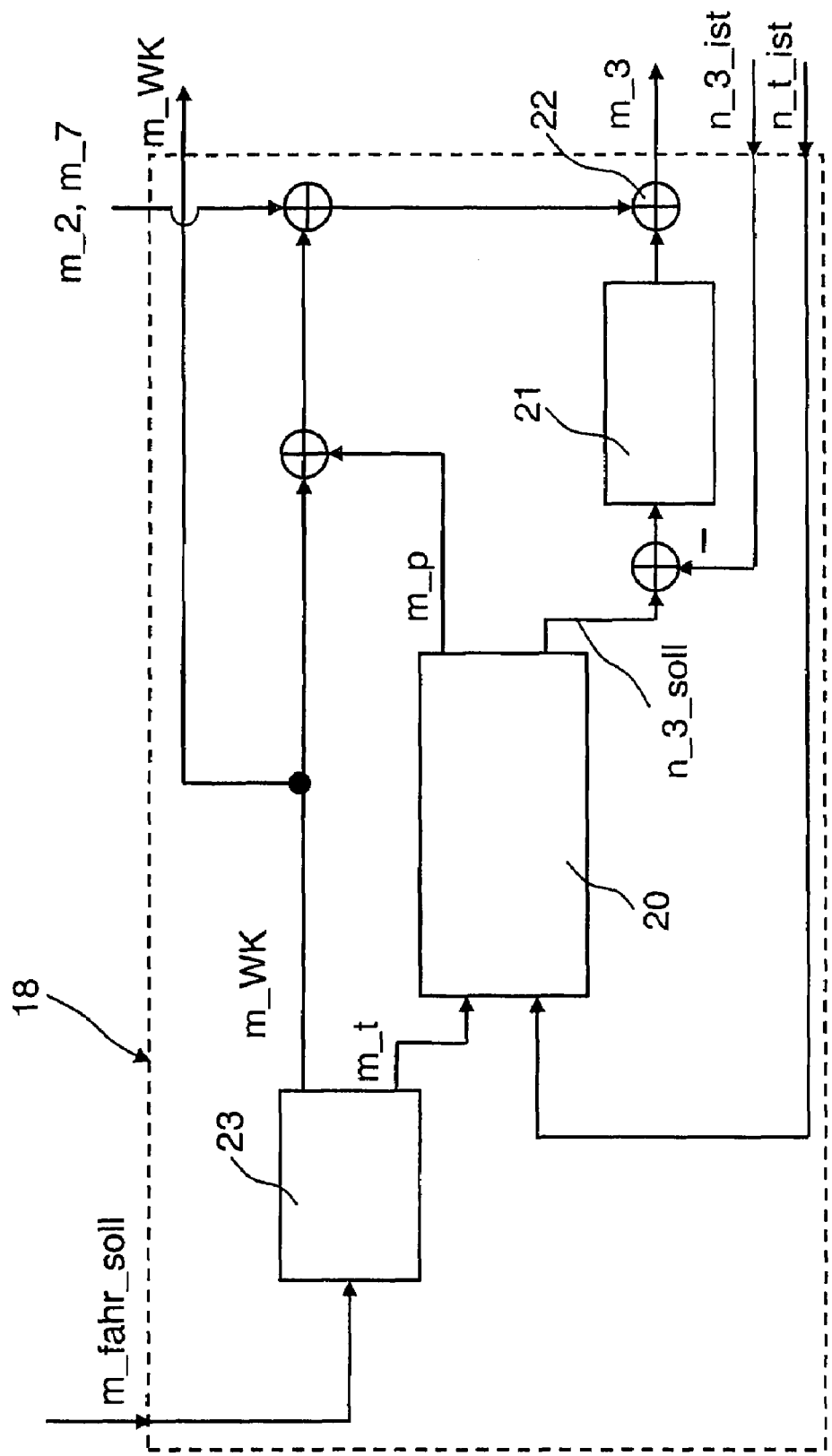
FIG. 17 is a presentation of a second version of the controller and regulator device according to FIG. 15, corresponding to FIG. 16, with a target value specification for the converter bridging clutch during a startup operation of the internal combustion engine.

Alternatively, the parallel hybrid drive train 1 according to FIG. 1 is operated during starting acceleration and starting procedures, during which the converter bridging clutch 8B has a transmitting capacity at which torques can be carried over it, with a control and regulator device 18 according to FIG. 17, which fundamentally corresponds to the version of the control and regulator device 18 without the splitting of the determined target torque between the electric motor 3 and the internal combustion engine.

In addition, the transmitting capacity m_7 of the shifting element 7, or as the case may be the torque m_7 that can be carried by the shifting element 7, represents a control value of the speed regulator structure according to FIG. 15 during a starting procedure of the internal combustion engine 2, which makes it possible to couple the internal combustion engine 2 to the electric motor 3 without an output-side reactive torque when there is a request to switch on the internal combustion engine 2 in the previously describe inventive way and to start the machine.

After starting the internal combustion engine 2, in the speed regulator structure according to FIG. 15, a switch 25 is turned over and the torque produced by the internal combustion engine 2 is added to the process to be controlled, or the parallel hybrid drive train 1 as a control value.

In that way, the target drive torque m_3 supposed to be produced by the electric motor 3 during a purely electric-motor powered starting acceleration procedure of the vehicle or during a starting procedure of the internal combustion engine 2, is determined in dependence on the load torques arising in the parallel hybrid drive train 1, which represent the disturbance variables in the regulation.

The internal combustion engine 2 is increasingly brought into functional connection with the electric motor by the rise in the transmitting capacity of the control unit 7, whereby with increasing transmitting capacity of the shifting element 7, the rotatable masses of the still shut off internal combustion engine 2 are opposed to the drive torque of the electric motor 3 as load-torque disturbance. This means that load torque disturbance that results from switching on the shifting element 7 is initially high due to the overcoming of the high motor friction and compression torques and in principle diminishes again after starting the internal combustion engine.

During the starting procedure, the internal combustion engine 2 is given, as target value, a starting torque in the form of a target load position or a target speed, for example, the actual speed of the electric motor 3, in order to bring the shifting element 7 into a synchronous state in a simple way and within a short processing time. After connecting the internal combustion engine 2 via the shifting element 7, the second shifting element 7 can be engaged, and then there can be load acceptance from the electric motor 3 to the internal combustion engine 2, whereby engaging the shifting element 7 and the load acceptance can, however, be carried out at the same time.

The increasing load-torque distance of the regulation of the target drive torque m_3 of the electric motor 3, caused by the increase in the transmitting capacity of the shifting element 7 can, in some instances, in order to reduce the load on the electric motor 3, be reduced in a time-triggered manner, through reduction of the transmitting capacity of the shifting element 7, whereby the transmitting capacity m_7 of the shifting element 7, in contrast to the previously described manner, can be continuously increased, starting from the point in time T_8 to the point in time T_11, to the third intermediate value m_7_3, without transmitting capacity diminishing to the second intermediate value m_7_2.

In principle, with the method of the invention, torque for initiating pumping and the associated pumping speed of a torque converter is determined via a known converter behavior, subject to a driver-demanded target output, which is equivalent to a transmission-input torque, and a transmission speed determined by measuring technology or the equivalent actual turbine speed of the torque converter. The torque for initiating pumping and the pump speed of the torque converter can be determined under the assumption of a quasi-stationary transmission of the hydrodynamic torque converter. The conditional equations for a typical Trilok converter and the appropriate monotonous characteristic line lead to an implicit system of equations that provide an unequivocal solution to the sought-after value. In order to resolve these equations, interactive procedures, such as Newton's method or offline calculations can be used, which provide the results in the form of characteristic diagrams.

In the event that the influence of the converter recognition is to be reduced through the use of a converter bridging clutch, the method of the invention can be broadened in a simple manner by splitting the target transmission input torque equivalent to the target output torque requested by the driver by means of a torque splitting factor between the converter bridging clutch and the hydrodynamic torque converter. The target transmission input torque, reduced by the torque carried by the converter bridging clutch, is then applied, as a target turbine torque, to the target value determination of the pumping initiation torque of the torque converter. The target drive torque that is to be produced by the electric motor and/or the internal combustion engine can then be determined by adding together the determined pumping initiation torque of the torque converter and the torque proportion that is to be carried via the converter bridging clutch.

The torque splitting factor between the torque converter and the converter bridging clutch can, for example, be determined subject to the output speed of the output of the parallel hybrid drive train and the driver request regarding the target output torque and can be stored respectively as an operating state-dependent characteristic value in characteristic diagrams or similar features of a control device of the parallel hybrid drive train of a motor vehicle, or determined currently during operation of a parallel hybrid drive train via a suitable calculation algorithm.

REFERENCE NUMBERS

1 Parallel hybrid drive train
2 Internal combustion engine
3 Electric motor
4 Transmission
5 Output
6 Device for attenuating rotational uniformity
7 Second shifting element
8 First shifting element
8A Torque converter
8B Converter bridging clutch
9 Axis differential
10 Wheels
11 Brake system
12 Brake booster
13 Electric accumulator
14 Electric control device
15 Onboard network
16 Electric transmission control device
17 Engine control unit
18 Control and regulator device
19 Motor vehicle
20 First functional block
21, 21A, 21B Regulator device
22, 22A, 22B Nodal point
23 Second functional block
24 Nodal point
25 Switch
m_2 Drive torque internal combustion engine
m_3 Drive torque electric motor
m_7 Transmitting capacity of the shifting element
m_WK Transmitting capacity of the converter bridging clutch
m_p Pumping torque
m_t Turbine torque
n_t Turbine speed
n_2 Internal combustion engine speed
n_3 Electric engine speed
T_0 to T_17 Points in time
t Time

The invention claimed is:

1. A method of driving a parallel hybrid drive train (1) of a motor vehicle (19) having, as drive units (2, 3), at least one internal combustion engine (2), at least one electric motor (3), and an output (5), and a friction locking shifting element (7), along the drive train (1), the electric motor (3) is located between the internal combustion engine (2) and the output (5), the friction locking shifting element (7) is located between the internal combustion engine (2) and the electric motor (3), and a hydrodynamic torque converter (8A) is located between the electric motor (3) and the output (5), the method comprising the steps of:

determining a target drive torque (m_2, m_3) depending on one of a target output torque (m_drive_target), an actual turbine torque (n_t_actual) of the hydrodynamic torque converter (8A), and an equivalent speed value (n_ab) of the parallel hybrid drive train (1) and an actual speed (n_3_actual) of the electric motor (3) via inverse converter recognition of the hydrodynamic torque converter (8A); and applying the target output torque (m_drive_target), which is subject to slip of the hydrodynamic torque converter (8A), to the output (5).

2. The method according to claim 1, further comprising the step of determining one of a target drive speed (n_3_target) of the electric motor (3) or the equivalent speed value (n_ab) of the parallel hybrid drive train (1) via the inverse converter recognition to determine the target drive torque (m_2, m_3), subject to the target output torque (m_drive_target), used for calculating one of a control deviation between the actual speed (n_3_actual) of the electric motor (3) and the equivalent actual speed of the parallel hybrid drive train (1) and one of the target drive speed (n_3_target) of the electric motor (3) and the equivalent speed of the parallel hybrid drive train (1).

3. The method according to claim 2, further comprising the step of applying the control deviation of the drive speed of the electric motor (3) and the equivalent speed value of the parallel hybrid drive train (1) of a regulator device (21; 21A; 21B), as an initial value with an output value representing the control algorithm of the target drive torque (m_2, m_3).

4. The method according to claim 3, further comprising the step of determining one of a target pumping torque (m_P) of the torque converter (8A), and an equivalent torque for determination of the target drive torque (m_2, m_3), via the inverse converter recognition, subject to the target output torque (m_drive_target), which represents a control proportion of the target drive torque (m_2, m_3) to be determined, and adding the control algorithm of the target drive torque (m_2, m_3) to be determined.

5. The method according to claim 2, further comprising the step of selecting at least one of the internal combustion engine (2) and the electric motor (3) that produce the target drive torque (m_2, m_3) by means of a drive strategy module.

6. The method according to claim 5, further comprising the step of determining a proportion of the target drive torque (m_2, m_3) to be produced by at least one of the internal combustion engine (2) and the electric motor (3) respectively by means of the drive strategy module, after addition of the control proportion and the control algorithm of the target drive torque (m_2, m_3).

7. The method according to claim 6, further comprising the step of determining a control proportion and a control algorithm for each drive unit (2, 3) to determine the proportion of the target drive torque (m_2, m_3) to be produced by the drive units (2, 3), whereby the sum of the control proportions of the target drive torques (m_2, m_3) produced by the drive units (2, 3), corresponds to the target pumping torque (m_P) of the torque converter (8A), while the control algorithms of the proportion of the target drive torque (m_2, m_3) to be produced by the drive units (2, 3) are determined respectively by means of the control units (21A, 21B) assigned to the drive units (2, 3), subject to the target drive speed (m_3_target) of the electric motor (3) determined by means of the inverse converter recognition.

8. The method according to claim 1, further comprising the step of selectively adjusting the target drive torque (m_2, m_3) produced by means of at least one of the drive units (2, 3) subject to further operating state parameters (m_7, m_2) of the parallel hybrid drive train (1), which represent disturbance variables of the regulation of the electric motor (3).

9. The method according to claim 1, further comprising the step of producing the target drive torque (m_2, m_3), with the presence of the shifting element (7) arranged between the electric motor (3) and the internal combustion engine (2) with a transmission capacity, at which essentially no torque can be carried via the shifting element (7), and when the internal combustion engine (2) is switched off, is essentially produced by the electric motor (3), whereby the internal combustion engine (2), when there is an order to produce a drive torque from the internal combustion engine, (2) is connected to the parallel hybrid drive train (1) through a change in a transmission capacity of the shifting element (7).

10. The method according to claim 9, further comprising the step of setting the transmission capacity of the shifting element (7), after connecting the internal combustion engine (2), to a reduced value for stress on the electric motor (3) relative to strain on the electric motor (3), before connecting the internal combustion engine (2).

11. The method according to claim 9, further comprising the step of setting the transmission capacity of the shifting element (7) at a value, at the end of a predefined period based on the value required for the connection of the internal combustion engine (2), that reduces the strain on the electric motor (3) relative to the strain on the electric motor (3) before connecting the internal combustion machine (2).

12. The method according to claim 9, further comprising the step of continuously setting the transmission capacity of the shifting element (7) at a value during a starting procedure of the internal combustion engine (2) at which the shifting element (7) displays full transmitting capacity.

13. The method according to claim 1 further comprising the step of setting the transmission capacity of the shifting element (7) to the value required for connecting the internal combustion engine (2), when there is a demand to connect the internal combustion engine (2), such that the internal combustion engine (2), when shut off, with increasing transmission capacity of the second shifting element (7), is increasingly driven by the electric motor (3), a drag torque (m_7) that results from this and also counteracts the drive torque (m_3) of the electric motor (3), representing a disturbance variable for the regulation of the electric motor (3).

14. The method according to claim 1, further comprising the step of operating the internal combustion engine (2), during starting procedures, by means of one of a controlled target drive torque curve a target drive speed curve, such that with a connected internal combustion engine (2), the shifting element (7) is transferred to a synchronous state.

15. The method according to claim 14, further comprising the step of setting a transmission capacity of the shifting element (7), with a connected internal combustion engine (2) and in a synchronous operating state of the shifting element (7) at a value, at which a torque applying to the second shifting element (7) is transferred at least slip-free.

16. The method according to claim 1, further comprising the step of accepting a load from the electric motor (3) to the internal combustion machine (2) with both a synchronous and engaged shifting element (7) and a connected internal combustion engine (2).

17. The method according to claim 1, further comprising the step of setting the target drive torque (m_2) of the electric motor (3), during a starting procedure of the internal combustion engine (2) with a switched-off internal combustion engine (2), subject to the target output torque (m_drive_target) to be applied at the output (5), a set parameter (m_7) of the transmission capacity of the shifting element (7), the actual turbine speed (n_t_actual) of the torque converter (8A), and the actual speed (n_3_actual) of the electric motor (3).

18. The method according to claim 1, further comprising the step of setting the target drive torque (m_3) of the electric motor (3), during a starting procedure of the internal combustion engine (2) with a switched off internal combustion engine (2), subject to the target output torque (m_drive_target) to be applied at the output (5), a set parameter (m_2) of the transmission capacity of the internal combustion engine (2), the actual turbine speed (n_t_actual) of the torque converter (8A), and the actual speed (n_3_actual) of the electric motor (3).

19. The method according to claim 1, further comprising the step of setting the proportion of the target drive torque (m_2, m_3) that is to be carried via the converter bridging clutch (8B), subject to the speed (n_ab) of the output (5) and a target output torque (m_drive_target) to be applied at the output, when there is the converter bridging clutch (8A) in the parallel hybrid drive train (1), which is arranged parallel to the torque converter (8A), and a transmission capacity of the converter bridging clutch is continuously adjustable and can be bridged by the torque converter (8A).

20. The method according to claim 19, further comprising the step of adding the proportion of the target drive torque (m_2, m_3) to be carried by the converter bridging clutch (8B) to a target pumping torque (m_P) of the torque converter (8A) that is determined subject to the inverse converter recognition and represents one of the sum of the torques of the control proportion of the target drive torques (m_2, m_3) that are to be produced by at least one of the drive units (2, 3), and the sum of the control proportions of the target drive torques (m_2, m_3) to be jointly produced by at least two of the drive units (2, 3).

21. The method according to claim 19, further comprising the step of transferring the converter bridging clutch (8B), with the presence of the shifting element (7) arranged between the electric motor (3) and the internal combustion engine (2), to slip operation when there is transmitting capacity at which essentially no torque can be carried by the shifting element (7) and with a switched off internal combustion engine (2), as well as when there is a demand to connect the internal combustion engine (2) by changing one or more of the transmitting capacity and the drive speed (n_3) of the electric motor (3), at a time when a target output torque (m_drive_target) is at the output (5).

22. The method according to claim 19, further comprising the step of increasing the transmitting capacity of the converter bridging clutch (8B), with a synchronous shifting element (7), from the value equivalent to the target output torque (m_drive_target) to be applied at the output (5) to a predefined value and determining if the transmitting capacity of the converter bridging clutch (8B), in a query section, slippage in the converter bridging clutch during a predefined period lies below a predefined target slippage value.

23. The method according to claim 22, further comprising the step of increasing the transmitting capacity of the converter bridging clutch (8B) from the predefined value to the full transmitting capacity if a positive query result exists.

24. The method according to claim 22, further comprising the step of maintaining the transmitting capacity of the converter bridging clutch (8B) at the predefined value with a negative query result and increasing the full transmitting capacity after an end of a monitoring period.

25. The method according to claim 22, further comprising the step of maintaining the converter bridging clutch in slip operation after a load acceptance from the electric motor (3) to the internal combustion engine (2).

* * * * *